United States Patent
Cao

(10) Patent No.: US 10,855,426 B2
(45) Date of Patent: Dec. 1, 2020

(54) ELECTRONIC DEVICE AND COMMUNICATION METHOD

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/341,071

(22) PCT Filed: Jan. 16, 2018

(86) PCT No.: PCT/CN2018/072817
§ 371 (c)(1),
(2) Date: Apr. 11, 2019

(87) PCT Pub. No.: WO2018/133771
PCT Pub. Date: Jul. 26, 2018

(65) Prior Publication Data
US 2019/0238282 A1   Aug. 1, 2019

(30) Foreign Application Priority Data

Jan. 18, 2017  (CN) .......................... 2017 1 0033252

(51) Int. Cl.
| | |
|---|---|
| H04L 5/00 | (2006.01) |
| H04W 72/04 | (2009.01) |
| H04J 11/00 | (2006.01) |
| H04W 88/08 | (2009.01) |
| H04B 7/0417 | (2017.01) |
| H04B 7/06 | (2006.01) |

(Continued)

(52) U.S. Cl.
CPC ............. *H04L 5/005* (2013.01); *H04B 7/024* (2013.01); *H04B 7/0417* (2013.01); *H04B 7/0617* (2013.01); *H04J 11/00* (2013.01); *H04J 11/005* (2013.01); *H04L 5/00* (2013.01); *H04W 68/005* (2013.01); *H04W 72/046* (2013.01); *H04W 88/085* (2013.01)

(58) Field of Classification Search
CPC ........ H04L 5/005; H04B 7/024; H04B 7/0417
See application file for complete search history.

(56) References Cited

U.S. PATENT DOCUMENTS 10,009,905 B2 * 6/2018 Kakishima ........... H04B 7/0413

FOREIGN PATENT DOCUMENTS

| CN | 103688583 A | 3/2014 |
|---|---|---|
| CN | 106105300 A | 11/2016 |

(Continued)

OTHER PUBLICATIONS

International Search Report dated Mar. 27, 2018 for PCT/CN2018/072817 filed on Jan. 16, 2018, 9 pages including English Translation.

*Primary Examiner* — Chandrahas B Patel
(74) *Attorney, Agent, or Firm* — Xsensus LLP

(57) ABSTRACT

The present disclosure relates to an electronic device and communication method. An electronic device used in a first terminal device side is configured for acquiring configuration information of reference signals of a second cell from a first control device of a first cell, measuring the reference signals based on the configuration information and feeding back information indicating the space beams in the second cell interfering with the first terminal device to the first control device.

12 Claims, 8 Drawing Sheets

(51) Int. Cl.
*H04W 68/00* (2009.01)
*H04B 7/024* (2017.01)

(56) References Cited

FOREIGN PATENT DOCUMENTS

WO 2015/135139 A1 9/2015
WO 2016/013889 A1 1/2016

* cited by examiner

ELECTRONIC DEVICE AND COMMUNICATION METHOD

CROSS-REFERENCE TO RELATED APPLICATION

The present application is based on PCT filing PCT/CN2018/072817, filed Jan. 16, 2018, which claims the benefit of, and priority to Chinese Patent Application No. 201710033252.8 filed on Jan. 18, 2017. The entire disclosure of each is incorporated herein by reference.

TECHNICAL FIELD

The present disclosure relates to an electronic device and communication method, and more particularly, to an electronic device and communication method for inter-cell interference coordination.

BACKGROUND

In the process of continuous evolution of 3GPP (3rd Generation Partnership Project), Multi-Input Multi-Output (MIMO) technology can be used to increase system capacity to meet growing traffic demand.

In a MIMO system, a base station (as a control device and a communication node) has multiple antennas supporting MIMO technology. Each base station antenna can form a space beam with relatively narrow directivity to provide relatively strong power coverage for a specific user equipment (UE) (also referred to as a terminal device) in a cell to resist relatively large path loss in the high frequency band. However, the space beam with relatively narrow directivity may also generate relatively strong interference to UEs of other cells. Therefore, inter-cell interference coordination needs to be performed for existing MIMO system.

CoMP (Coordinated Multiple Point) technology can be utilized to perform inter-cell interference coordination. For example, by using Coordinated Scheduling/Coordinated Beamforming (CS/CB) in the CoMP technology, a plurality of base stations in a CoMP set can coordinately determine user scheduling/beamforming, thereby enabling inter-cell interference coordination.

However, coordinated scheduling/coordinated beamforming, especially coordinated beamforming, requires sharing a large amount of control signals and/or data among cells within a CoMP set, for example, channel information from the aggressor cell to the interfered user equipment needs to be exchanged between the aggressor cell and the interfered cell, as the number of antennas increases, this may result in relatively large signaling overhead or delay, thus affecting the ability of CoMP technology to resolve the inter-cell interference. Therefore, there is a need for a mechanism to perform inter-cell interference coordination more efficiently and quickly.

SUMMARY

A brief summary of the disclosure is set forth below to provide a basic understanding of some aspects of the disclosure. However, it should be understood that this summary is not an exhaustive overview of the disclosure. It is not intended to identify a key or critical part of the disclosure, nor is it intended to limit the scope of the disclosure. Its purpose is merely to present some of the concepts of the present disclosure in a simplified form as a preface to a more detailed description presented later.

According to an aspect of the present disclosure, an electronic device used in a first terminal device side of a wireless communication system is provided. The electronic device can include: a memory for storing computer instructions; and processing circuit configured to perform the computer instructions stored thereon for: acquiring configuration information of reference signals of a second cell from a first control device of a first cell, wherein the first cell is adjacent to the second cell, the first terminal device is in the first cell; measuring the reference signals of the second cell based on the configuration information to determine interferences of space beams corresponded to the reference signals of the second cell to the first terminal device; and feeding back information indicating the space beams in the second cell interfering with the first terminal device to the first control device, for performing interference coordination between the first cell and the second cell.

According to another aspect of the present disclosure, an electronic device used in a first control device side of a wireless communication system is provided. The electronic device can include: a memory for storing computer instructions; and a processing circuit configured to perform the computer instructions stored thereon for: acquiring configuration information of reference signals of a second cell from a second control device in the second cell adjacent to a first cell controlled by the first control device, for a first terminal device in the first cell to determine interferences of space beams corresponded to the reference signals of the second cell to the first terminal device based on the configuration information; acquiring information indicating the space beams interfering with the first terminal device in the second cell from the first terminal device; and performing interference coordination between the first cell and the second cell based on the acquired information indicating the space beams interfering with the first terminal device.

According to still another aspect of the present disclosure, an electronic device used in a second control device side of a wireless communication system is provided. The electronic device can include: a memory for storing computer instructions; and a processing circuit configured to perform the computer instructions stored thereon for: notifying a first control device in the first cell adjacent to a second cell controlled by the second control device of configuration information of reference signals of the second cell, for a first terminal device in the first cell to determine interferences of space beams corresponded to the reference signals of the second cell to the first terminal device based on the configuration information; acquiring information indicating the space beams interfering with the first terminal device in the second cell from the first control device; and performing interference coordination between the first cell and the second cell based on the acquired information indicating the space beams interfering with the first terminal device.

According to still another aspect of the present disclosure, an electronic device used in a second terminal device side of a wireless communication system is provided. The electronic device can include: a memory for storing computer instructions; and a processing circuit configured to perform the computer instructions stored thereon for: acquiring information indicating forbidden of the space beams interfering with a first terminal device in a first cell from a second control device in a second cell, wherein the first cell is adjacent to the second cell, and the second terminal device is in the second cell; and not feeding back information indicating space beams to be forbidden to the second control device to make the second control device forbid those space beams.

According to still another aspect of the present disclosure, a communication method for a wireless communication system is provided. The method can include: a first terminal device acquires configuration information of reference signals of a second cell from a first control device of a first cell, wherein the first cell is adjacent to the second cell, the first terminal device is in the first cell; the first terminal device measures the reference signals of the second cell based on the configuration information to determine interferences of space beams corresponded to the reference signals of the second cell to the first terminal device; and the first terminal device feeds back information indicating the space beams in the second cell interfering with the first terminal device to the first control device, for performing interference coordination between the first cell and the second cell.

According to still another aspect of the present disclosure, a communication method for a wireless communication system is provided. The method can include: a first control device acquires configuration information of reference signals of a second cell from a second control device in the second cell adjacent to a first cell controlled by the first control device, for a first terminal device in the first cell to determine interferences of space beams corresponded to the reference signals of the second cell to the first terminal device based on the configuration information; the first control device acquires information indicating the space beams interfering with the first terminal device in the second cell from the first terminal device; and the first control device performs interference coordination between the first cell and the second cell based on the acquired information indicating the space beams interfering with the first terminal device.

According to still another aspect of the present disclosure, a communication method for a wireless communication system is provided. The method can include: a second control device notifies a first control device in the first cell adjacent to a second cell controlled by the second control device of configuration information of reference signals of the second cell, for a first terminal device in the first cell to determine interferences of space beams corresponded to the reference signals of the second cell to the first terminal device based on the configuration information; the second control device acquires information indicating the space beams interfering with the first terminal device from the first control device; and the second control device performs interference coordination between the first cell and the second cell based on the acquired information indicating the space beams interfering with the first terminal device.

According to still another aspect of the present disclosure, a communication method for a wireless communication system is provided. The method can include: a second terminal device acquires information indicating forbidden of the space beams interfering with a first terminal device in a first cell from a second control device in a second cell, wherein the first cell is adjacent to the second cell, and the second terminal device is in the second cell; and the second terminal device does not feedback information indicating space beams to be forbidden to the second control device to make the second control device forbid those space beams.

According to still another aspect of the present disclosure, a computer readable storage medium is provided. The computer readable storage medium comprises executable instructions which, when executed by an information processing apparatus, cause the information processing apparatus to perform the communication method according to the present disclosure.

According to one or more embodiments of the present disclosure, interference generated by an aggressor cell to a terminal device of a serving cell (interfered cell) can be effectively and quickly reduced.

DRAWINGS

The drawings constituting a part of the specification describe embodiments of the present disclosure and are used together with the description to explain the principles of the present disclosure.

The present disclosure can be more clearly understood from the following detailed description with reference to the accompanying drawings, in which.

DETAILED DESCRIPTION

Figure 1:
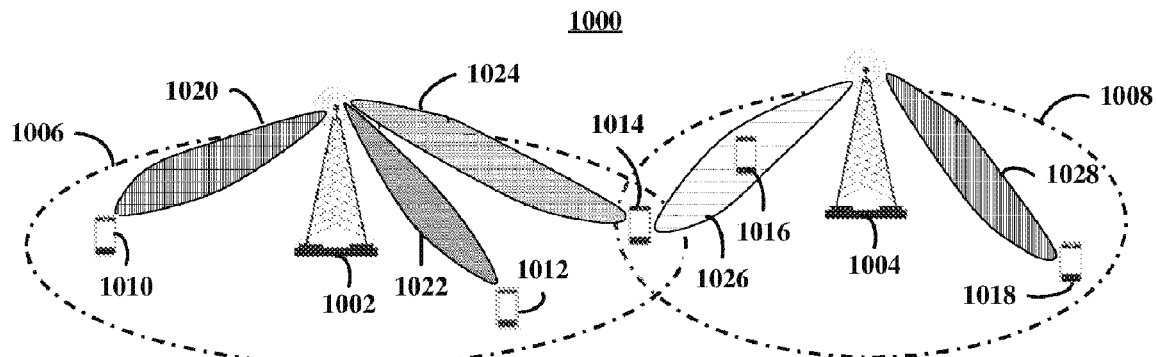
FIG. 1 is a schematic diagram illustrating inter-cell interference in a wireless communication system.

Various exemplary embodiments of the present disclosure will now be described in detail with reference to the drawings. It should be noted that the relative arrangement of the components and steps, numerical expressions and numerical values set forth in the embodiments are not intended to limit the scope of the disclosure, unless otherwise specified.

In the meantime, it should be understood that the dimensions of the various parts shown in the drawings are not drawn in the actual scale relationship for the convenience of the description.

The following description of the at least one exemplary embodiment is in practical merely illustrative and is in no way intended to be a limitation of the present disclosure and its application or use.

Techniques, methods and devices known to those of ordinary skill in the relevant art may not be discussed in detail, but the techniques, methods and devices should be considered as part of the specification, where appropriate.

In all of the examples shown and discussed herein, any specific values are to be construed as illustrative only and not as a limitation. Accordingly, other examples of the exemplary embodiments may have different values.

It should be noted that similar reference numerals and letters indicate similar items in the following drawings, and therefore, once an item is defined in one drawing, it is not required to be further discussed in the subsequent drawings.

To facilitate a better understanding of the technical solutions in accordance with the present disclosure, some of the concepts used in the present disclosure are briefly described below.

A base station, such as an evolved Node B (eNB), has multiple antennas that support MIMO technology. The use of MIMO technology enables a base station to utilize spatial domain to support spatial multiplexing, beamforming, and transmit diversity. Spatial multiplexing can be used to simultaneously transmit different data streams on the same frequency. These data streams can be transmitted to a single UE to increase the data rate (which can be referred to as SU-MIMO technology) or to multiple UEs to increase the total system capacity (which can be referred to as MU-MIMO technology). This is achieved by spatially precoding each data stream (i.e., applying scaling and phase adjustment of the amplitude) and then transmitting each spatially precoded stream on the downlink (DL) through multiple transmit antennas. The spatially precoded data streams arrive at the UE(s) with different spatial signatures, which enables each of the UE(s) to recover one or more data streams destined for the UE. On the uplink (UL), each UE transmits a spatially precoded data stream, which enables the base station to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of a cell, a single stream beamforming transmission may be used in combination with transmit diversity.

In the detailed description that follows, various aspects of an access network will be described with reference to a MIMO system supporting orthogonal frequency division multiplexing (OFDM) on the DL. OFDM is a spread-spectrum technique that modulates data over a number of subcarriers within an OFDM symbol. These subcarriers are spaced apart at precise frequency. The spacing provides the "orthogonality" that enables a receiver to recover data from the subcarriers. In the time domain, a guard interval (e.g., cyclic prefix) may be added to each OFDM symbol to combat inter-OFDM-symbol interference. The UL may use single-carrier frequency division multiple access (SC-FDMA) in the form of OFDM signal extended by a discrete Fourier transform (DFT) to compensate for high peak-to-average power ratio (PARR).

Next, the radio protocol architecture for the user plane and the control plane in LTE (Long Term Evolution) is explained. The radio protocol architecture for the UE and the eNB is shown with three layers: Layer 1, Layer 2, and Layer 3. Layer 1 (L1 layer) is the lowest layer and implements various physical layer signal processing functions. L1 layer will be referred to herein as the physical layer. Layer 2 (L2 layer) is above the physical layer and is responsible for the link between the UE and the eNB over the physical layer.

In the user plane, the L2 layer includes a Medium Access Control (MAC) sublayer, a Radio Link Control (RLC) sublayer, and a Packet Data Convergence Protocol (PDCP) sublayer, which are terminated at the eNB on the network side. The UE may also have several upper layers above the L2 layer, including a network layer (e.g., an IP layer) that is terminated at the PDN gateway on the network side, and an application layer that is terminated at the other end of the connection (e.g., for end UE, server, etc.).

The PDCP sublayer provides multiplexing among different radio bearers and logical channels. The PDCP sublayer also provides header compression for upper layer data packets to reduce radio transmission overhead, security by ciphering the data packets, and handover support for UEs between eNBs. The RLC sublayer provides segmentation and reassembly of upper layer data packets, retransmission of lost data packets, and reordering of data packets to compensate for out-of-order reception due to hybrid automatic repeat request (HARQ). The MAC sublayer provides multiplexing between logical and transport channels. The MAC sublayer is also responsible for allocating various radio resources (e.g., resource blocks) in one cell among the UEs. The MAC sublayer is also responsible for HARQ operations.

In the control plane, the radio protocol architecture for the UE and the eNB is substantially the same for the physical layer and the L2 layer, with the exception that there is no header compression function for the control plane. The control plane also includes a Radio Resource Control (RRC) sublayer in Layer 3 (L3 layer). The RRC sublayer is responsible for obtaining radio resources (i.e., radio bearers) and for configuring the lower layers using RRC signalings between the eNB and the UE.

Briefly introduce various signal processing functions of the L1 layer (i.e., physical layer) implemented on the base station side. These signal processing functions include coding and interleaving to facilitate forward error correction (FEC) at the UE and mapping to signal constellations based on various modulation schemes (e.g., binary phase-shift keying (BPSK), quadrature phase-shift keying (QPSK), M-phase-shifting Keying (M-PSK), M-Quadrature Amplitude Modulation (M-QAM)). The coded and modulated symbols are then split into parallel streams. Each stream is then mapped to an OFDM subcarrier, multiplexed with reference signals (e.g., pilots) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimation may be used to determine the coding and modulation scheme, as well as for spatial processing. The channel estimatation may be derived from a reference signal and/or channel condition feedback transmitted by the UE. Each spatial stream is then provided to a different antenna via a separate transmitter. Each transmitter modulates an RF carrier with a respective spatial stream for transmission.

At the UE, each receiver receives a signal through its respective antenna. Each receiver recovers information modulated onto an Radio Frequency (RF) carrier and provides the information to the various signal processing functions of the L1 layer. Spatial processing is performed on the information at the L1 layer to recover any spatial streams destined for the UE. If multiple spatial streams are destined for the UE, they may be combined into a single OFDM symbol stream. The OFDM symbol stream is then converted from the time-domain to the frequency domain using a Fast Fourier Transform (FFT). The frequency domain signal comprises a separate OFDM symbol stream for each subcarrier of the OFDM signal. The symbols on each subcarrier, and the reference signal are recovered and demodulated by determining the most likely signal constellation points transmitted by the eNB. These soft decisions may be based on channel estimation. The soft decisions are then decoded and deinterleaved to recover the data and control signals that were originally transmitted by the eNB on the physical channel. These data and control signals are then provided to higher layer for processing.

Some terms related to the downlink reference signal and channel state information and the like are described below.

Downlink Reference Signal

The downlink reference signal is a predefined signal occupying a specific Resource Element (RE) in a downlink time-frequency Resource Block (RB). In the LTE downlink, the following different types of reference signals are included:

Cell-specific Reference Signal (CRS): generally referring to a common reference signal that can be used by all UEs in a cell.

Demodulation Reference Signal (DMRS): for dedicated users, being embedded in data.

Channel State Information Reference Signal (CSI-RS): used to estimate channel state information, thereby assisting resource scheduling and precoding work of the base station.

Channel State Information (CSI)

The channel state information is used to indicate the channel state of the channel between the base station and the UE. The channel state information may include a rank indicator (RI), a precoding matrix indicator (PMI), and a channel quality indicator (CQI).

The RI is information about the channel rank. The channel rank indicates the maximum number of layers that can carry different information in the same time-frequency resource.

The PMI is used to indicate an index of a specific precoding matrix in a codebook which includes a plurality of precoding matrices and is shared between a base station and a UE.

The CQI indicates the channel quality and may be used to help determine the corresponding modulation scheme and coding rate.

In addition, a CRI (CSI-RS Resource Indicator) is used to indicate a preferred CSI-RS resource, and the UE measures each CSI-RS resource and feeds back the recommended space beam in the form of a CRI. The UE may indicate the best quality CSI-RS beam received by the UE to the base station, by feeding back CRI.

CSI Process (CSI-Process)

A plurality of CSI processes may be configured for the UE such that the UE performs CSI measurement and reporting for each CSI process.

The following is a brief introduction to full-dimension MIMO (FD-MIMO) technology.

FD-MIMO technology may greatly improve system capacity by using a two-dimensional antenna array with, for example, up to 64 antenna ports at the eNB. The benefits of using multiple antenna ports at the eNB may include small inter-cell interference and high beamforming gain. The use of a two-dimensional antenna array allows for UE-specific beamforming in both the horizontal and vertical directions.

In an FD-MIMO system, the number of transmit antennas at an eNB can be increased by, for example, 8 to 10 times compared to a conventional 8-antenna MIMO system. These additional transmit antennas can result in greater beamforming gain and introduce less interference to neighboring cells.

In conventional MIMO technology with a one-dimensional antenna array, UE-specific beamforming can be performed only in the horizontal direction. The common vertical downtilt can be applied to multiple UEs.

In the FD-MIMO technique with a two-dimensional antenna array, UE-specific beamforming can be performed in both the horizontal direction and the vertical direction.

In conventional linear precoding, the eNB requires MIMO channel state information (CSI) for the full channel. For example, conventional beamforming/precoding methods rely on the availability of CSI for the entire transmit dimension (e.g., requiring instantaneous/statistical knowledge of the channel from each eNB transmit antenna to one or more UE receive antennas).

Such CSI is either fed back by the UE PMI/RI or obtained by utilizing channel reciprocity. In a TDD (Time Division Duplex) system, CSI is primarily acquired at the eNB by utilizing bidirectional channel reciprocity. In an FDD (Frequency Division Duplex) system, CSI is typically measured and quantized at the UE and then fed back to the eNB via a dedicated uplink channel. In general, the size of the codebook used for CSI quantization increases as the number of transmit antennas at the eNB increases.

The PMI/RI report of the UE may be based on pilot-assisted estimation of the DL full channel. The pilot (or common reference signal) overhead and DL channel estimation complexity may be proportional to the number of eNB antennas. Therefore, the complexity of PMI/RI selection may increase as the number of eNB antennas increases. On the other hand, based on the known mechanism of coordinated scheduling/coordinated beamforming, the UE needs not only to report the PMI related to the serving cell to the eNB, but also needs to know in advance the codebook of the neighboring cell in which interference may occur and report the PMI of the interfering cell.

The inter-cell interference in a wireless communication system will be briefly described below with reference to FIG. 1. As illustrated in FIG. 1, a wireless communication system 1000 includes base stations 1002, 1004 and terminal devices 1010, 1012, 1014, 1016, 1018. The terminal devices 1010, 1012, and 1014 are located in the cell 1006, and are controlled by the base station 1002. The terminal devices 1016 and 1018 are located in the cell 1008 and are controlled by the base station 1004. The cell 1006 is adjacent to the cell 1008.

It should be understood that the base stations described in the present specification may be implemented as any type of eNBs or other type of base stations or the like (refer to "application example regarding base station" described later), and the base station is sometimes also referred to as a control device hereinafter; the terminal devices described in the specification of the present disclosure can be implemented as mobile terminals or in-vehicle terminals or the like (see "application example regarding terminal device" described later), and the terminal device is sometimes also referred to as a UE hereinafter.

In the wireless communication system 1000, the base stations 1002, 1004 can simultaneously schedule a plurality of terminal devices on the same time-frequency resource block to implement space division multiplexing of modulation symbol streams of multiple terminal devices on the same time-frequency resource. For example, as illustrated in FIG. 1, terminal devices 1010, 1012, and 1014 in cell 1006 may be scheduled together on the same time-frequency resource and different space beams (as illustrated by three beams 1020, 1022, and 1024 transmitted by base station 1002 of FIG. 1), and terminal devices 1016 and 1018 in the cell 1008 may be scheduled together on the same time-frequency resource and different space beams (as illustrated by the two beams 1026 and 1028 transmitted by the base station 1004 of FIG. 1). In addition, as illustrated in FIG. 1, the space beam 1024 of the cell 1006 can provide relatively strong power coverage to the terminal device 1014 located at the edge of the cell 1006, but the terminal device 1014 is also subject to relatively strong interference from the space beam 1026 of the cell 1008, and thus inter-cell interference coordination is required to reduce the interference generated by the space beam of the cell 1008 to the terminal device 1014 located at the edge of the cell 1006.

In the following, the cell 1006 in which the terminal device 1014 is located is also referred to as a serving cell, and the base station 1002 is referred to as a serving base station. The cell 1008 adjacent to the cell 1006 is referred to as an aggressor cell, and the base station 1004 is referred to as an aggressor base station.

A signaling diagram of inter-cell interference coordination in accordance with one embodiment of the present disclosure will be described below with reference to FIG. 2.

Figure 2:
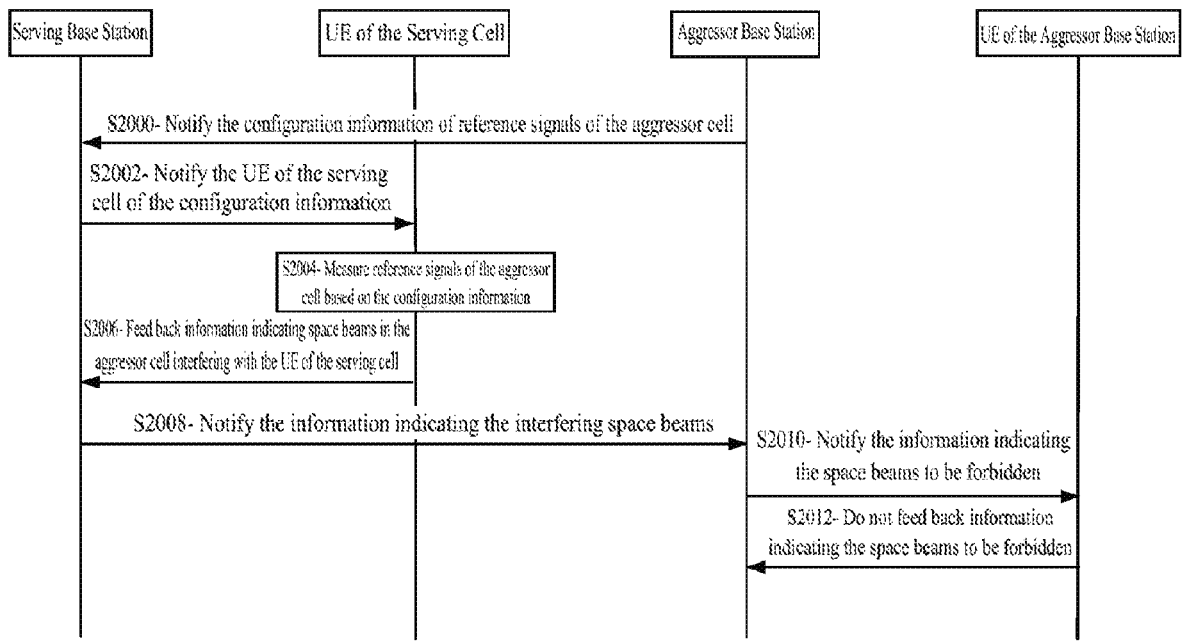
FIG. 2 is a signaling diagram illustrating inter-cell interference coordination, in accordance with one embodiment of the present disclosure.

The inter-cell interference coordination shown in FIG. 2 can be applied, for example, to the wireless communication system 1000 shown in FIG. 1. In addition, the serving base station shown in FIG. 2 may correspond to, for example, the base station 1002 shown in FIG. 1, and the UE of the serving cell shown in FIG. 2 may correspond, for example, to one or more of the terminal devices 1010, 1012, and 1014 shown in FIG. 1. The aggressor base stations shown in FIG. 2 may correspond, for example, to the base station 1004 shown in FIG. 1, and the UE in the aggressor cell shown in FIG. 2 may correspond, for example, to one or more of the terminal device 1016 and 1018 shown in FIG. 1.

In the embodiment of the present disclosure, in order to perform inter-cell interference coordination, the UE of the serving cell measures the reference signals of the aggressor cell transmitted by space beams to determine inferences of the space beams from the aggressor cell to the UE of the serving cell. Steps S2000 to S2004 shown in FIG. 2 illustrate an exemplary implementation manner of measuring reference signals of an aggressor cell by a UE of a serving cell, which will be specifically described below.

As illustrated in FIG. 2, in step S2000, the aggressor base station notifies the serving base station of the configuration information of reference signals of the aggressor cell.

According to one embodiment of the present disclosure, an aggressor base station may notify the serving base station of the configuration information of reference signals of the aggressor cell transmitted by space beams through a communication link between base stations. The communication link between base stations may be, for example, an X2 interface that is primarily used to carry handover and interference related information between cells. In one example, the aggressor base station can notify the serving base station of the configuration information via a load indication message on the X2 interface. The load indication process is used to transfer load and interference coordination information between base stations of intra-frequency neighboring cells and between base stations of inter-frequency neighboring cells.

According to one embodiment of the present disclosure, an aggressor base station notifies a serving base station of the configuration information in the case of receiving a request from the serving base station.

According to one embodiment of the present disclosure, reference signals of an aggressor cell may be dedicated reference signals. According to another embodiment of the present disclosure, reference signals of an aggressor cell may be implemented using a beamformed CSI-RS (e.g., Class B CSI in the current LTE standard, hereinafter also referred to as BF-CSI-RS).

According to one embodiment of the present disclosure, the configuration information of a reference signal of an aggressor cell may include information indicating the location of a resource element (RE) carrying the reference signal in a resource block (RB). In one embodiment, in a case that a reference signal of an aggressor cell is a BF-CSI-RS, the configuration information of the reference signal of the aggressor cell may include information indicating the location of each BF-CSI-RS corresponding to each space beam of the aggressor cell in the RB. In one embodiment, where a reference signal of an aggressor cell is a BF-CSI-RS, the configuration information of the reference signal of the aggressor cell may include a CRI obtained by measuring the BF-CSI-RS of an aggressor cell by a UE of the aggressor cell (e.g., measuring the received signal power (for example, RSRP) or signal to interference and noise ratio (SINR) of the BF-CSI-RS.), and the CRI may indicate a space beam with a larger power coverage in the aggressor cell, and thus may indicate a space beam in the aggressor cell that may result in relative large interference to the serving cell. In addition, the configuration information of reference signals of the aggressor cell may include the cell number of the aggressor cell.

In step S2002, the serving base station notifies the UE of the serving cell of the configuration information of reference signals of the aggressor cell.

According to one embodiment of the present disclosure, in a case where a reference signal of an aggressor cell is a BF-CSI-RS, a serving base station may configure a plurality of CSI-Processes for a UE of a serving cell by using RRC signaling, wherein at least one CSI-Process is used to notify the UE of the serving cell of the configuration information of the BF-CSI-RS of the aggressor cell, the format of the CSI measurement report, resources occupied by the CSI measurement report, trigger conditions and the like, while other CSI-Processes can be used for the CSI report of the serving cell. In the present embodiment, the UE of the serving cell may report the CRI of the aggressor cell to the serving base station in the specified subframe according to the CSI-Process pre-configured by the serving base station, and the serving base station may then determine for which CSI-Process the CSI is according to the sequence number of the subframe of the report received by the serving base station, thereby can determine the cell number of the aggressor cell corresponding to the CRI according to the configuration of the CSI-Process, that is, the UE reports the cell number of the aggressor cell in an implicit manner.

According to one embodiment of the present disclosure, a serving base station may provide a UE of a serving cell with configuration information of the BF-CSI-RS of the aggressor cell by using a CSI-IM (CSI Interference Measurement) resource in RRC signaling of an RRC sublayer carried on a Physical Downlink Shared Channel (PDSCH). For example, the configuration of the CSI-IM resource is as shown in Table 1 below.

TABLE 1

| CSI-IM-ConfigExt::= | SEQUENCE { |
|---|---|
| csi-IM-ConfigId | CSI-IM-ConfigId, |
| resourceConfig | INTEGER (0..31), |
| subframeConfig | INTEGER (0..154), |
| ..., | |
| InterferenceCellId | INTEGER (0..503), |
| InterferenceCRI | INTEGER (0..7), |
| Or | |
| InterferenceCRI | BIT STRING (SIZE (3)), |
| } | |

In Table 1, the cell number of the aggressor cell is carried by the "InterferenceCellId" variable, and the CRI obtained by the UE of the aggressor cell measuring the BF-CSI-RS of the aggressor cell is carried by the "InterferenceCRI" variable. In addition, Table 1 shows a case where the number of BF-CSI-RSs of the aggressor cell is 8, and accordingly, the above CRI may be represented by an integer between 0 and 7, or may be represented by a 3-bit bit string. A similar design can be made when the number of BF-CSI-RSs of the aggressor cell is another value.

It should be noted that Table 1 shows an example of a case where the configuration information of the aggressor cell includes the cell number of the aggressor cell and the CRI obtained by the UE of the aggressor cell measuring the BF-CSI-RS of the aggressor cell, a similar configuration can also be made by CSI-IM when the configuration information of reference signals of the aggressor cell includes other information.

In step S2004, the UE of the serving cell may measure reference signals of the aggressor cell based on the obtained configuration information to determine interferences of space beams corresponded to the reference signals of the aggressor cell to the UE of the serving cell. For example, the UE of the serving cell may measure the received signal power (e.g., RSRP) or the signal to interference and noise ratio (SINR) of reference signals of the aggressor cell according to the obtained configuration information, and determine the aggressor cell and its interference beam according to the measurement result.

It should be understood that the foregoing steps S2000-S2004 are only one example rather than limitation of implementation of measuring reference signals of an aggressor cell by the UE of the serving cell, and those skilled in the art, under the teachings of the present disclosure, can implement other methods for measuring reference signals of the aggressor cell.

In order to perform interference coordination between the serving cell and the aggressor cell, in step S2006, the UE of the serving cell feeds back information indicating the space beams in the aggressor cell interfering with the UE of the serving cell to the serving base station.

According to one embodiment of the present disclosure, the information indicating the interfering space beams may include information indicating the space beams in the aggressor cell interfering with the UE of the serving cell most. In one embodiment, in the case that the reference signals of the aggressor cell are BF-CSI-RSs, the information indicating the interfering space beams may include a CSI-RS resource indicator, i.e., a CRI. In the prior art, CRI is used to indicate a preferred BF-CSI-RS resource when the BF-CSI-RS of the present cell is measured by the UE (for example, the CRI obtained by measuring the BF-CSI-RS of an aggressor cell by a UE of the aggressor cell, as described above). In an embodiment of the present disclosure, the BF-CSI-RS of an aggressor cell is measured by a UE of a serving cell, and the corresponding CRI may be used to indicate the space beams in the space beams corresponding to the BF-CSI-RS of the aggressor cell interfering with the UE of the serving cell most. In addition, the information indicating the interfering space beams may further include the cell number of the aggressor cell.

It should be noted that, hereinafter, the CRI, which is obtained by measuring the BF-CSI-RS of the aggressor cell by the UE of the serving cell, indicating the space beams in the space beams of the aggressor cell interfering with the UE of the serving cell most, is referred to as interfering CRI, to distinguish it from the CRI, which is obtained by measuring the BF-CSI-RS of the present cell by the UE, indicating the BF-CSI-RS resources preferred in the present cell.

In step S2008, the serving base station notifies the aggressor base station of the information indicating the interfering space beams.

According to one embodiment of the present disclosure, a serving base station may notify an aggressor base station of the information indicating the interfering space beams through a communication link (for example, an X2 interface) between base stations. In one example, the serving base station may notify the aggressor base station of the information indicating the interfering space beams through a load indication message on the X2 interface. In another example, in a case where the reference signal of the aggressor cell is a BF-CSI-RS, the serving base station may provide the CSI report of the UE of the serving cell to the aggressor base station in the X2 signaling, wherein the CSI report includes the interfering CRI measured by the UE of the serving cell. In some embodiments, the X2 signaling may be reported by the serving base station to the aggressor base station on the basis of a request of the aggressor base station. For example, the request corresponds to a RESOURCE STATUS REQUEST message transmitted on the X2 interface, and the CSI report containing the interfering CRI is encapsulated in a RESOURCE STATUS UPDATE message.

In step S2010, the aggressor base station notifies the UE of the aggressor cell of the information indicating the space beams to be forbidden.

According to one embodiment of the present disclosure, the information indicating the space beams to be forbidden includes information related to the interfering CRI. In the following, the information indicating the space beams to be forbidden will be described in detail with reference to Table 2 and Table 3.

In step S2012, the UE of the aggressor cell does not feed back information indicating the space beams to be forbidden to the aggressor base station. Therefore, the aggressor base station no longer configures the space beam for the UE of the aggressor cell, and the space beam is forbidden, so that the interference of the space beam to the UE of the serving cell is suppressed.

In one embodiment, the UE of the aggressor cell does not feed back the interfering CRI to the aggressor base station, so that the aggressor base station does not configure the BF-CSI-RS corresponding to the interfering CRI for the UE of the aggressor cell, thereby realizing the forbiddance of the space beam.

The procedure of steps S2008 to S2012 described above is an exemplary implementation for performing interference coordination between a serving base station and an aggressor base station, but the present disclosure is not limited to the above implementation manner, and other implementations for inter-cell interference coordination according to the present disclosure will be further described below.

As can be seen from the above description with reference to FIG. 2, unlike the coordinated scheduling/coordinated beamforming in the prior art, in the inter-cell interference coordination according to one embodiment of the present disclosure shown in FIG. 2, since only the configuration information of reference signals of an aggressor cell and the information indicating the interfering space beams are shared between a serving cell and the aggressor cell, without needing to share a large amount of control signals and/or data, the communication link between the cells has a short delay and a small signaling overhead, and can effectively and quickly suppress interferences of the space beams between cells.

An electronic device used in a first terminal device side of a wireless communication system and a communication method thereof according to an embodiment of the present disclosure will be described below with reference to FIGS. 3 and 4. The first terminal device may, for example, correspond to the UE of the serving cell illustrated in FIG. 2. In addition, the first cell, the second cell, the first control device, the second control device, and the second terminal device, which are described below, may correspond to the serving cell, the aggressor cell, the serving base station, the aggressor base station, and the UE of the aggressor cell illustrated in FIG. 2, respectively.

Figure 3:
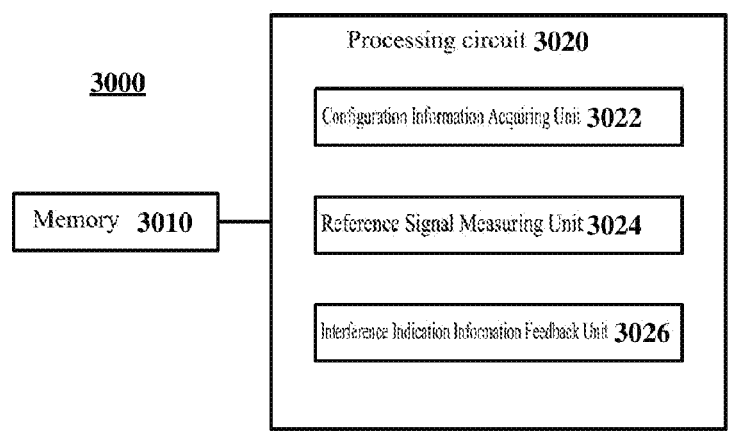
FIG. 3 is a configuration block diagram illustrating an electronic device used in a first terminal device side of a wireless communication system, according to an embodiment of the present disclosure.

FIG. 3 illustrates a configuration block diagram of an electronic device 3000 used in a first terminal device side of a wireless communication system, according to an embodiment of the present disclosure. In one embodiment, the electronic device 3000 can include, for example, a memory 3010 and a processing circuit 3020.

The memory 3010 of the electronic device 3000 can store information generated by the processing circuit 3020 as well as programs and data operated by of the electronic device 3000. The memory 3010 can be a volatile memory and/or a non-volatile memory. For example, memory 3010 can include, but is not limited to, random access memory (RAM), dynamic random access memory (DRAM), static random access memory (SRAM), read only memory (ROM), and flash memory.

The processing circuit 3020 of the electronic device 3000 provides various functions of the electronic device 3000. In an embodiment of the present disclosure, the processing circuit 3020 of the electronic device 3000 may include a configuration information acquiring unit 3022, a reference signal measuring unit 3024, and an interference indication information feedback unit 3026, configured to perform, respectively, steps S4000, S4002, and S4004 in the communication method of the electronic device used in the first terminal device side of the wireless communication system illustrated in FIG. 4 described later.

The processing circuit 3020 may refer to various implementations of digital circuitry, analog circuitry, or mixed signal (combination of analog and digital) circuitry that perform functions in a computing system. The processing circuit may include, for example, circuit such as an integrated circuit (IC) and an application specific integrated circuit (ASIC), a portion or circuit of a separate processor core, an entire processor core, a separate processor, a programmable hardware device such as a field programmable gate array (FPGA), and/or a system including multiple processors.

Additionally, the electronic device 3000 can be implemented at the chip level, or can be implemented at the device level by including other external components. In one embodiment, the electronic device 3000 can be implemented as a first terminal device as a whole, and can also include one or more antennas.

It should be understood that the various units described above are only logical blocks that are divided according to the specific functions which they implement, and are not intended to limit the specific implementation. In actual implementation, each of the above units may be implemented as a separate physical entity, or may be implemented by a single entity (e.g., a processor (CPU or DSP, etc.), an integrated circuit, etc.).

Figure 4:
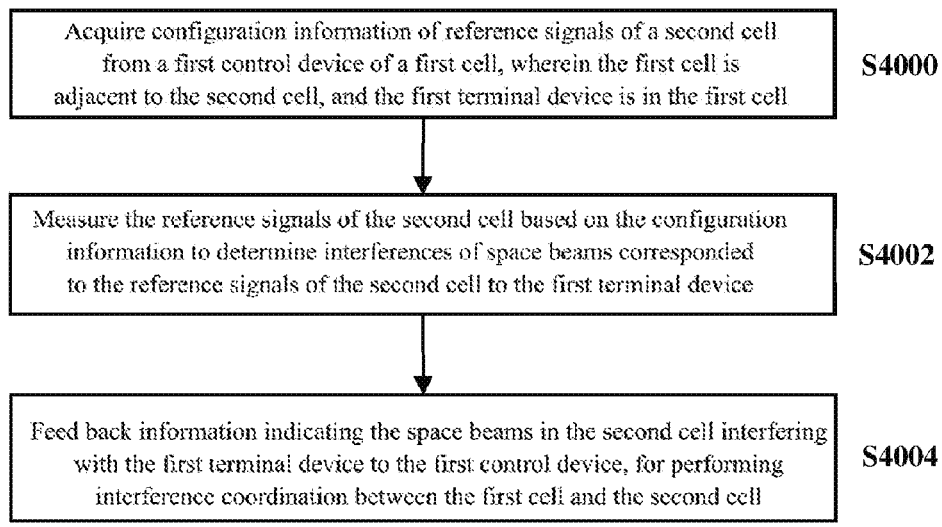
FIG. 4 is a flowchart illustrating a communication method for a first terminal device side of a wireless communication system, according to an embodiment of the present disclosure.

FIG. 4 illustrates a flowchart of a communication method for a first terminal device side of a wireless communication system, according to an embodiment of the present disclosure. The communication method can be used, for example, for the electronic device 3000 as illustrated in FIG. 3.

As illustrated in FIG. 4, in step S4000, the first terminal device acquires configuration information of reference signals of a second cell from a first control device of a first cell, wherein the first cell is adjacent to the second cell, and the first terminal device is in the first cell.

According to an embodiment of the present disclosure, the reference signals of the second cell and the configuration information of the reference signals of the second cell may respectively correspond to the reference signals of the aggressor cell and the configuration information of the reference signals of the aggressor cell described with reference to FIG. 2, the description thereof will not be repeated herein.

In step S4002, the first terminal device measures the reference signals of the second cell based on the configuration information to determine interferences of space beams corresponded to the reference signals of the second cell to the first terminal device. Step S4002 may correspond, for example, to step S2004 in FIG. 2.

In step S4004, the first terminal device feeds back information indicating the space beams in the second cell interfering with the first terminal device to the first control device, for performing interference coordination between the first cell and the second cell. Step S4004 may correspond, for example, to step S2006 in FIG. 2.

As has been described above, the reference signals of the second cell according to an embodiment of the present disclosure may be BF-CSI-RSs. In one embodiment, the reference signals of the second cell may be non-zero power BF-CSI-RSs, which will be described in detail below with reference to FIGS. 5A and 5B.

Figure 5A:
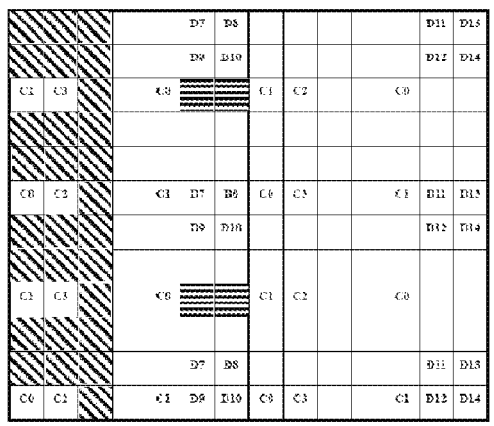
FIGS. 5A and 5B are schematic diagrams illustrating occupancy of reference signals on resource blocks, according to one embodiment of the present disclosure.
Figure 5B:
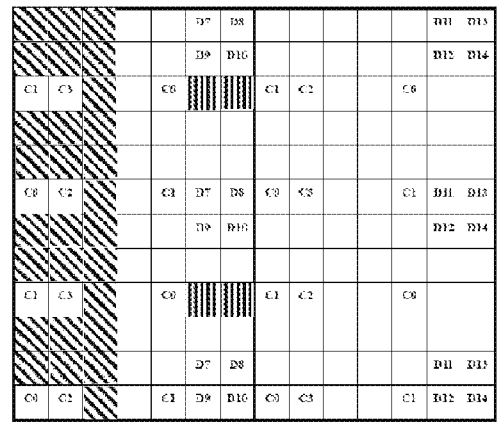

FIGS. 5A and 5B are schematic diagrams illustrating the occupancy of reference signals on resource blocks, in accordance with one embodiment of the present disclosure. Specifically, FIG. 5A illustrates the occupancy of reference signals of a first cell resource blocks, and FIG. 5B illustrates the occupancy of reference signals of a second cell on resource blocks. In the resource blocks illustrated in FIG. 5A and FIG. 5B, resource elements C0 to C3 correspond to CRS ports 0 to 3, respectively, and resource elements D7 to D14 correspond to DMRS ports 7 to 14, respectively, and resource elements shown with horizontal hatching correspond to zero power BF-CSI-RS (ZP BF-CSI-RS) ports, and resource elements shown with vertical hatching correspond to non-zero power BF-CSI-RS (NZP BF-CSI-RS) ports.

As illustrated in FIG. 5A and FIG. 5B, in the resource blocks of the first cell and the second cell, zero-power BF-CSI-RSs and non-zero-power BF-CSI-RSs are configured respectively at positions of the same resource element, wherein the reference signals of the second cell measured by the first terminal device is non-zero power BF-CSI-RSs. In this way, in the resource blocks of the first cell, it is a zero-power BF-CSI-RS that is configured at the position of a resource element corresponding to the non-zero-power BF-CSI-RS of the second cell, so that the first terminal device can measure interferences generated by space beams of the second cell without being affected by reference signals of the present cell (i.e., the first cell).

It should be understood that the occupancy of reference signals on resource blocks according to the present disclosure is not limited to the cases illustrated in FIGS. 5A and 5B. Those skilled in the art, with the teachings of the present disclosure, are able to make similar designs depending on actual application.

According to one embodiment of the present disclosure, information indicating the interfering space beams may be fed back to a first control device through an uplink control channel or an uplink data channel. In one embodiment, information indicating the interfering space beams may be fed back to a first control device through a Physical Uplink Control Channel (PUCCH). In another embodiment, information indicating the interfering space beams may be fed back to a first control device through the Physical Uplink Shared Channel (PUSCH) as part of the uplink data.

According to one embodiment of the present disclosure, reference signals of a second cell are measured in a case where information for indicating that interference coordination between the first cell and the second cell is to be performed is acquired from the first control device. In one embodiment, the first control device may notify the first terminal device whether to perform interference coordination through RRC signaling. For example, a 1-bit "CRISubsetRestrictionFlag1" variable may be set in the RRC signaling, when "CRISubsetRestrictionFlag1=1", it indicates that interference coordination is to be performed, and when "CRISubsetRestrictionFlag1=0", it indicates not to perform interference coordination.

Next, an electronic device used in a first control device side of a wireless communication system and a communication method thereof according to an embodiment of the present disclosure will be described with reference to FIGS. 6 and 7. The first control device may, for example, correspond to the serving base station shown in FIG. 2. In addition, the first cell, the second cell, the first terminal device, the second terminal device, and the second control device, which are described below, may correspond to, for example, the serving cell, the aggressor cell, the UE of the serving cell, the UE of the aggressor cell, and the aggressor base station shown in FIG. 2, respectively.

Figure 6:
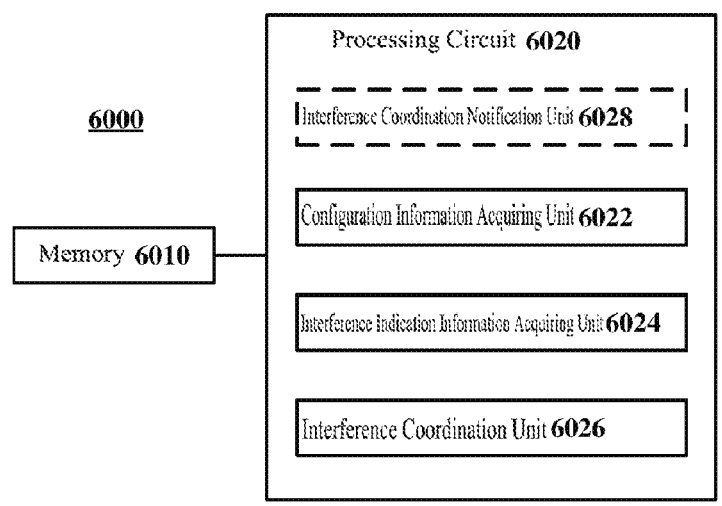
FIG. 6 is a configuration block diagram illustrating an electronic device for a first control device side of a wireless communication system, according to an embodiment of the present disclosure.

FIG. 6 illustrates a configuration block diagram of an electronic device 6000 used in a first control device side of a wireless communication system, according to an embodiment of the present disclosure. In one embodiment, the electronic device 6000 can include, for example, a memory 6010 and a processing circuit 6020.

The memory 6010 of the electronic device 6000 can store information generated by the processing circuit 6020 and programs and data operated by of the electronic device 6000. The memory 6010 can be a volatile memory and/or a non-volatile memory. For example, memory 6010 can include, but is not limited to, random access memory (RAM), dynamic random access memory (DRAM), static random access memory (SRAM), read only memory (ROM), and flash memory.

The processing circuit 6020 of the electronic device 6000 provides various functions of the electronic device 6000. In an embodiment of the present disclosure, the processing circuit 6020 of the electronic device 6000 may include a configuration information acquiring unit 6022, an interference indication information acquiring unit 6024, and an interference coordination unit 6026, configured to perform, respectively, steps S7000, S7002, and S7004 in the communication method of the electronic device used in the first control device side of the wireless communication system illustrated in FIG. 7 described later.

According to one embodiment of the present disclosure, the processing circuit 6020 may further include an interference coordination notification unit 6028 configured to execute step S7006 in the communication method of the electronic device used in the first control device side of the wireless communication system illustrated in FIG. 7 described later.

The processing circuit 6020 may refer to various implementations of digital circuitry, analog circuitry, or mixed signal (combination of analog and digital) circuitry that perform functions in a computing system. The processing circuit may include, for example, circuit such as an integrated circuit (IC) and an application specific integrated circuit (ASIC), a portion or circuit of a separate processor core, an entire processor core, a separate processor, a programmable hardware device such as a field programmable gate array (FPGA), and/or a system including multiple processors.

Additionally, the electronic device 6000 can be implemented at the chip level, or can be implemented at the device level by including other external components. For example, the electronic device 6000 can be implemented as a first control device as a whole, and can also include one or more antennas.

It should be understood that the various elements described above are only logical functional blocks that are divided according to the specific functions which they implement, and are not intended to limit the specific implementation. In actual implementation, each of the above functional units may be implemented as a separate physical entity, or may be implemented by a single entity (e.g., a processor (CPU or DSP, etc.), an integrated circuit, etc.).

Figure 7:
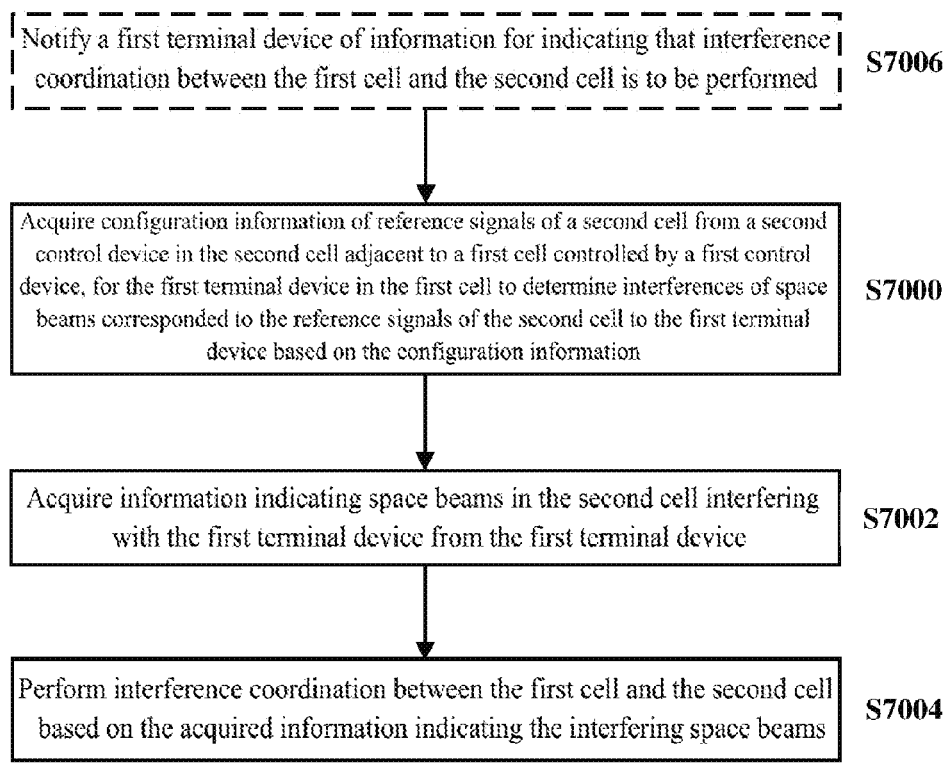
FIG. 7 is a flowchart illustrating a communication method for a first control device side of a wireless communication system according to an embodiment of the present disclosure.

FIG. 7 illustrates a flowchart of a communication method for a first control device side of a wireless communication system, according to an embodiment of the present disclosure. This communication method can be used, for example, for the electronic device 6000 as illustrated in FIG. 6.

As illustrated in FIG. 7, in step S7000, the first control device acquires configuration information of reference signals of a second cell from a second control device in the second cell adjacent to a first cell controlled by the first control device, for a first terminal device in the first cell to determine interferences of space beams corresponded to the reference signals of the second cell to the first terminal device based on the configuration information.

According to one embodiment of the present disclosure, the first control device may acquire configuration information of reference signals of the second cell from the second control device through a communication link (for example, an X2 interface) between base stations. In one example, the first control device can acquire the configuration information from the second control device via a load indication message on the X2 interface.

According to an embodiment of the present disclosure, the reference signals of the second cell and the configuration information of the reference signals of the second cell may respectively correspond to the reference signals of the aggressor cell and the configuration information of the reference signals of the aggressor cell described with reference to FIG. 2, the description thereof will not be repeated herein.

As described above with reference to FIG. 2, in one embodiment, in a case where the reference signal of the second cell is a BF-CSI-RS, the first control device may configure a plurality of CSI-Processs for the first terminal device, wherein at least one CSI-Process is used to notify the first terminal device of the configuration information of the BF-CSI-RS of the aggressor cell, the format of the CSI measurement report, resources occupied by the CSI measurement report, trigger conditions, and the like. In one embodiment, the first control device may provide configuration information of the BF-CSI-RS of the aggressor cell to the first terminal device by using the CSI-IM resource in the RRC signaling.

In step S7002, the first control device acquires, information indicating space beams in the second cell interfering with the first terminal device from the first terminal device.

According to one embodiment of the present disclosure, the information indicating the interfering space beams may include information indicating space beams in the second cell interfering with the first terminal device most. In one embodiment, in the case that the reference signal of the second cell is a BF-CSI-RS, the information indicating the interfering space beams may include the interfering CRI and the cell number of the second cell.

In step S7004, the first control device performs interference coordination between the first cell and the second cell based on the acquired information indicating the interfering space beams.

According to one embodiment of the present disclosure, performing interference coordination between the first cell and the second cell may include the first control device notifying the second control device of the information indicating the interfering space beams, for the second control device to forbid those space beams. This process may correspond, for example, to step S2008 in FIG. 2.

According to another embodiment of the present disclosure, performing interference coordination between the first cell and the second cell may include the first control device performing coordinated scheduling with the second control device so that the first control device and the second control device do not transmit control signals and/or data to the first terminal device on the same time-frequency resources or the first control device and the second control device transmit control signals and/or data to the first terminal device on the same time-frequency resources and different space beams.

In one embodiment, the first control device notifies the second control device of information indicating that coordinated scheduling is to be performed to initiate coordinated scheduling of the first control device and the second control device. The information indicating that the coordinated scheduling is to be performed can be delivered, for example, via the X2 interface. In one embodiment, the information indicating that the coordinated scheduling is to be performed may also be implemented by the information indicating space beams of reference signals of the second cell interfering with the first terminal device. In one embodiment, techniques such as coordinated scheduling/coordinated beamforming in CoMP technology may be used to perform coordinated scheduling of the first control device and the second control device.

In one embodiment, interference coordination between the first cell and the second cell is performed in the case that the service priority of the first control device is higher than the service priority of the second control device. In addition, in a case where the service priority of the first control device is lower than the service priority of the second control device, interference coordination between the first cell and the second cell is not performed. It should be understood that the service priority of the control device described herein refers to the priority of the service provided by the control device to the terminal device.

For example, assume that the service priority of the first control device is $SP_1$ and the service priority of the second control device is $SP_2$. In the case of $SP_1 \geq SP_2$, the priority of the service provided by the first control device to the first terminal device is higher than the priority of the service provided by the second control device to the second terminal device, and then in the case where the second cell interferes with the first terminal device of the first cell, interference coordination between the first cell and the second cell is performed, so that the interference subjected by the first terminal device controlled by the first control device is reduced. For example, as illustrated in FIG. 1, in the case of $SP_1 \geq SP_2$, the space beam 1026 is forbidden by performing interference coordination between the cell 1006 and the cell 1008, at that time the interference from the space beam 1026 of the neighboring cell 1008 subjected by the terminal device 1014 in the cell 1006 is reduced. Accordingly, however, the power coverage of the space beam of the terminal device 1016 in the cell 1008 is also reduced. In the case of $SP_1 < SP_2$, the priority of the service provided by the second control device to the second terminal device is higher than the priority of the service provided by the first control device to the first terminal device, and then the second control device may ignore the information from the first control device for performing interference coordination, thus may not perform interference coordination between the first cell and the second cell to preferentially ensure the service provided by the second control device to the second terminal device. For example, as illustrated in FIG. 1, in the case of $SP_1 < SP_2$, interference coordination between the first cell and the second cell is not performed, then the space beam 1026 is not forbidden, and the service may be provided to the terminal device 1016 in the second cell 1008 by the space beam 1026 continually, thereby preferentially ensuring the service provided by the second control device to the second terminal device.

In one embodiment, service priorities of the first control device and the second control device may be preset. In one embodiment, the information of the service priority may be communicated between the second control device and the second control device by controlling a communication link (the X2 interface) between the control devices.

By determining whether to perform interference coordination between the first cell and the second cell by comparing service priorities of the first control device and the second control device, it is possible to preferentially ensure the services provided by the control device with higher priority to its terminal device.

According to one embodiment of the present disclosure, in a case where the first control device acquires a plurality of pieces of information indicating the interfering space beams from a plurality of the first terminal devices over a predetermined number, interference coordination between the first cell and the second cell is performed.

For example, the first control device acquires K interfering CRIs (where K is more than a predetermined number M) from K first terminal devices, respectively, which indicates that the space beams in the second cell causes relatively strong interferences to a plurality of first terminal devices in the first cell, at this time, interference coordination between the first cell and the second cell is performed to reduce or eliminate interferences of the space beams in the second cell to the plurality of first terminal devices. In one embodiment, the predetermined number M can be preset in the first control device. In another embodiment, the predetermined number M may vary depending on channel conditions.

Refer back to step S7006 in FIG. 7. According to one embodiment of the present disclosure, optionally, a communication method for a first control device side of a wireless communication system may further include step S7006.

In step S7006, the first control device notifies a first terminal device of information for indicating that interference coordination between the first cell and the second cell is to be performed.

According to one embodiment of the present disclosure, a first control device may notify a first terminal device whether to perform interference coordination through RRC signaling. For example, a 1-bit "CRISubsetRestrictionFlag1" variable may be set in the RRC signaling, when "CRISubsetRestrictionFlag1=1", it indicates that interference coordination is to be performed, and when "CRISubsetRestrictionFlag1=0", it indicates not to perform interference coordination.

Next, an electronic device used in a second control device side of a wireless communication system and a communication method thereof according to an embodiment of the present disclosure will be described with reference to FIGS. 8 and 9. The second control device may, for example, correspond to the aggressor base station illustrated in FIG. 2. In addition, the first cell, the second cell, the first terminal device, the second terminal device, and the first control device, which are described below, may correspond to, for example, the serving cell, the aggressor cell, the UE of the serving cell, the UE of the aggressor cell, and the serving base station illustrated in FIG. 2, respectively.

Figure 8:
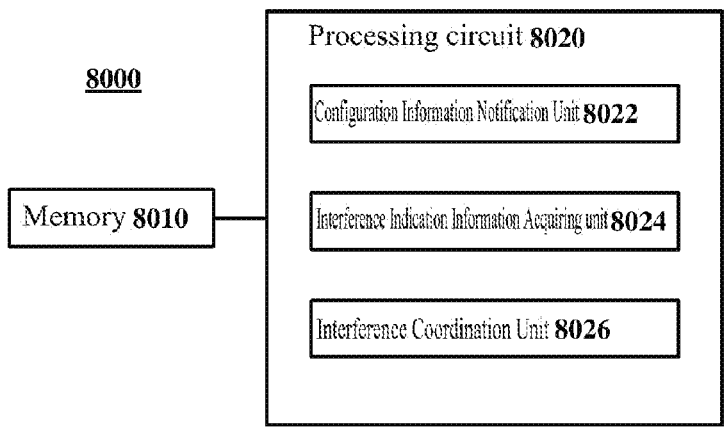
FIG. 8 is a configuration block diagram illustrating an electronic device for a second control device side of a wireless communication system according to an embodiment of the present disclosure.

FIG. 8 illustrates a configuration block diagram of an electronic device 8000 for a second control device side of a wireless communication system, according to an embodiment of the present disclosure. In one embodiment, the electronic device 8000 can include, for example, a memory 8010 and a processing circuit 8020.

The memory 8010 of the electronic device 8000 can store information generated by the processing circuit 8020 and programs and data operated by the electronic device 8000. The memory 8010 can be a volatile memory and/or a non-volatile memory. For example, the memory 8010 can include, but is not limited to, random access memory (RAM), dynamic random access memory (DRAM), static random access memory (SRAM), read only memory (ROM), and flash memory.

The processing circuit 8020 of the electronic device 8000 provides various functions of the electronic device 8000. In an embodiment of the present disclosure, the processing circuit 8020 of the electronic device 8000 may include a configuration information notification unit 8022, an interference indication information acquiring unit 8024, and an interference coordination unit 8026, configured to perform, respectively, steps S9000, S9002, and S9004 in the communication method of the electronic device used in the second control device side of the wireless communication system illustrated in FIG. 9 described later.

The processing circuit 8020 may refer to various implementations of digital circuitry, analog circuitry, or mixed signal (combination of analog and digital) circuitry that perform functions in a computing system. The processing circuit may include, for example, circuit such as an integrated circuit (IC) and an application specific integrated circuit (ASIC), a portion or circuit of a separate processor core, an entire processor core, a separate processor, a programmable hardware device such as a field programmable gate array (FPGA), and/or system including multiple processors.

Additionally, the electronic device 8000 can be implemented at the chip level, or can be implemented at the device level by including other external components. For example, the electronic device 8000 can be implemented as a second control device as a whole, and can also include one or more antennas.

It should be understood that the various units described above are only logical blocks that are divided according to the specific functions which they implement, and are not intended to limit the specific implementation. In actual implementation, each of the above functional units may be implemented as a separate physical entity, or may be implemented by a single entity (e.g., a processor (CPU or DSP, etc.), an integrated circuit, etc.).

Figure 9:
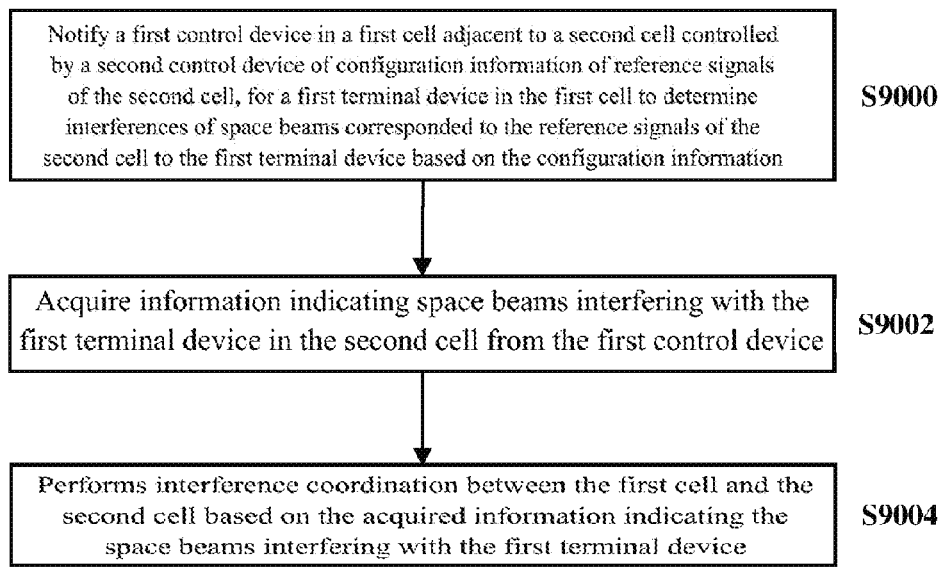
FIG. 9 is a flowchart illustrating a communication method for a second control device side of a wireless communication system according to an embodiment of the present disclosure.

FIG. 9 illustrates a flowchart of a communication method for a second control device side of a wireless communication system, according to an embodiment of the present disclosure. This communication method can be used, for example, for the electronic device 8000 as illustrated in FIG. 8.

As illustrated in FIG. 9, in step S9000, the second control device notifies a first control device in the first cell adjacent to a second cell controlled by the second control device of configuration information of reference signals of the second cell, for a first terminal device in the first cell to determine interferences of space beams corresponded to the reference signals of the second cell to the first terminal device based on the configuration information. Step S9000 may correspond, for example, to step S2000 in FIG. 2.

According to an embodiment of the present disclosure, the reference signals of the second cell and the configuration information of the reference signals of the second cell may respectively correspond to the reference signals of the aggressor cell and the configuration information of the reference signals of the aggressor cell described with reference to FIG. 2, the description thereof will not be repeated herein.

In step S9002, the second control device acquires information indicating the space beams interfering with the first terminal device in the second cell from the first control device.

As already described above, the exchange of information between the first control device and the second control device in steps S9000 and S9002 can be achieved by a communication link between base stations (e.g., an X2 interface).

In step S9004, the second control device performs interference coordination between the first cell and the second cell based on the acquired information indicating the interfering space beams.

According to one embodiment of the present disclosure, in a case where the reference signal of the second cell is a BF-CSI-RS, the information indicating the interfering space beams may include the interfering CRI and the cell number of the second cell.

According to one embodiment of the present disclosure, performing interference coordination between the first cell and the second cell may include the second control device to forbid at least one of the interfering space beams.

In one embodiment, the second control device notifies one or more second terminal devices in the second cell of information indicating space beams to be forbidden, so that the one or more second control devices do not feed back information indicating those space beams to the second control device.

In one embodiment, the second control device notifies the second terminal device in the second cell with a priority is lower than a predetermined threshold of the information indicating the space beams to be forbidden, so that the second terminal devices with a priority lower than the predetermined threshold do not feed back the information indicating the space beams to be forbidden to the second control device, thus to forbid those space beams. In addition, the second control device does not notify the second terminal devices whose priority is higher than the predetermined threshold of the information indicating the space beams to be forbidden, and the second terminal devices with high priority may continue to feed back the information indicating the space beams to the second control device, so that it is able to preferentially ensure good power coverage of these second terminal devices.

For example, as illustrated in FIG. 1, when the priority of the terminal device 1016 is below a predetermined threshold, the base station 1004 notifies the terminal device 1016 of information indicating the space beam 1026 to be forbidden, so as to forbid the space beam 1026, thereby reducing inter-cell interference. When the priority of the terminal device 1016 is higher than the predetermined threshold, the base station 1004 does not notify the terminal device 1016 of the information indicating the space beam 1026 to be forbidden, and the terminal device 1016 performs normal measurement and feedback of reference signals, so that the space beam 1026 can be made not forbidden, and the terminal device 1016 can continue to be provided with good power coverage.

In one embodiment, the predetermined threshold may be configured in advance by the second terminal device for the second terminal device.

According to one embodiment of the present disclosure, the information indicating space beams to be forbidden may be represented by a bit string whose number of bits coincides with the number of space beams of the second cell.

For example, assume the number of space beams of the second cell is N, a first bit string of N bits may be employed to denote the information indicating space beams to be forbidden, and the interfering CRI indicating space beams of the second cell may be denoted, for example, with $\log_2 N$ bits. Table 2 below shows the correspondence between the first bit string and the interfering CRI in the case of N=8.

According to the correspondence relationship of Table 2, for example, the first bit string "00000010" indicates that there is only one interfering CRI "001", and the first bit string "001001100" indicates that there are three interfering CRIs "010", "011", and "101". As described above, the representation of the first bit string can support the superposition of a plurality of interfering CRI representations.

According to another embodiment of the present disclosure, information indicating each space beam to be forbidden may be represented by a second bit string with the number of bits of $\log_2 N$ bits. Table 3 below shows the correspondence relationship between the second bit string and the corresponding interfering CRI in the case of N=8.

TABLE 3

| | Interfering CRI | | | | | | | |
|---|---|---|---|---|---|---|---|---|
| | 000 | 001 | 010 | 011 | 100 | 101 | 110 | 111 |
| Second bit string | 000 | 001 | 010 | 011 | 100 | 101 | 110 | 111 |

According to the correspondence of Table 3, when there is only one interfering CRI "001", it can be represented by the second bit string "001". When there are two interfering CRIs "010" and "011", it can be represented by the second bit string "010011". As it can be seen, in the case where there are a relatively few of interfering CRIs, the representation method (3-bit information or 6-bit information) of the second bit string shown in Table 3 may have less signaling overhead than the representation method (8-bit information) of the first bit string shown in Table 2.

Next, a method in which the second control device notifies the second terminal device of information indicating space beams to be forbidden according to an embodiment of the present disclosure is described.

In one embodiment, the second control device reconfigures the second terminal devices by including the information indicating the space beams to be forbidden in the high-level dedicated signaling (such as RRC signaling of the RRC sublayer) carried on the physical downlink shared channel (PDSCH), to notify the second terminal device of the information indicating those space beams. This configuration manner is called as a semi-static configuration. The semi-static configuration manner is configured through PDSCH, so the rich PDSCH resources can be used to carry more information, but the layer-by-layer decoding is required, and the configuration period is long.

For example, the semi-static configuration manner described above can be implemented by designing the configuration regarding the antenna in the RRC signaling as illustrated in Table 4 below.

TABLE 2

| | Interfering CRI | | | | | | | |
|---|---|---|---|---|---|---|---|---|
| | 000 | 001 | 010 | 011 | 100 | 101 | 110 | 111 |
| First bit string | 00000001 | 00000010 | 00000100 | 00001000 | 00010000 | 00100000 | 01000000 | 10000000 |

TABLE 4

```
AntennaInfoDedicated ::=    SEQUENCE {
    ...
    CRISubsetRestriction         CHOICE {
    N1TxAntenna                  BIT STRING (SIZE (8)),
    N2TxAntenna                  BIT STRING (SIZE (8)),
    N4TxAntenna                  BIT STRING (SIZE (8)),
    N8TxAntenna                  BIT STRING (SIZE (8)),
    N12TxAntenna                 BIT STRING (SIZE (8)),
    N16TxAntenna                 BIT STRING (SIZE (8)),
    N20TxAntenna                 BIT STRING (SIZE (8)),
    N24TxAntenna                 BIT STRING (SIZE (8)),
    N28TxAntenna                 BIT STRING (SIZE (8)),
    N32TxAntenna                 BIT STRING (SIZE (8)),
    }               OPTIONAL,
    or
    CRISubsetRestriction         CHOICE {
    N1TxAntenna                  BIT STRING (SIZE (3)),
    N2TxAntenna                  BIT STRING (SIZE (3)),
    N4TxAntenna                  BIT STRING (SIZE (3)),
    N8TxAntenna                  BIT STRING (SIZE (3)),
    N12TxAntenna                 BIT STRING (SIZE (3)),
    N16TxAntenna                 BIT STRING (SIZE (3)),
    N20TxAntenna                 BIT STRING (SIZE (3)),
    N24TxAntenna                 BIT STRING (SIZE (3)),
    N28TxAntenna                 BIT STRING (SIZE (3)),
    N32TxAntenna                 BIT STRING (SIZE (3)),
    }               OPTIONAL,
    ...
}
```

In Table 4, the information indicating the space beams to be forbidden (for example, information indicating the interfering CRI) is carried by the "CRISubsetRestriction" variable, N1TxAntenna, N2TxAntenna, N4TxAntenna, N8TxAntenna, N12TxAntenna, N16TxAntenna, N20TxAntenna, N24TxAntenna, N28TxAntenna and N32TxAntenna represent the cases that the number of antenna ports is 1, 2, 4, 8, 12, 16, 20, 24, 28 and 32, respectively. The cell may be virtual sectorized through CRI, and one CRI may correspond to one virtual sector in the cell, and there may be 1, 2, 4, 8, 12, 16, 20, 24, 28 or 32 antenna ports in the virtual sector.

As an example, Table 4 shows the case where the number of space beams is N=8. When the number of antenna ports is 1, 2, 4, . . . , 32, an 8-bit bit string (for example, corresponding to the first bit string shown in Table 2) or a 3-bit bit string (for example, corresponding to the second bit string shown in Table 3) can be used to represent "CRISubsetRestriction".

It should be understood that the number of antenna ports in Table 4 is merely illustrative and not limiting, and a similar design may be made depending on actual situation when the number of antenna ports is another value. In addition, a similar design can be made to the "CRISubsetRestriction" variable when the number of space beams N is another value.

In one embodiment, the second control device reconfigures the second terminal device by including the information indicating the space beams to be forbidden in the information (e.g. downlink control information (DCI)) carried on the physical downlink control channel (PDCCH), to notify the second terminal device of the information indicating those space beams. This configuration manner is called as a dynamic configuration. The dynamic configuration is configured through the PDCCH, so the configuration period is short and has strong timeliness, but the resources that can be utilized are limited compared with the semi-static configuration.

In addition, in the dynamic configuration mode, resources may also be added to the existing DCI, so that the information indicating space beams to be forbidden can be included in the DCI and communicated to the second terminal device.

In one embodiment, an improved dynamic configuration manner can be implemented by combining the semi-static configuration manner with the dynamic configuration manner described above. For example, the second control device notifies the second terminal device of the information indicating the space beams to be forbidden by the higher layer dedicated signaling (such as RRC signaling of the RRC sublayer) carried on the PDSCH, and notifies the second terminal device of whether the space beam forbidden is to be performed by the control information (e.g. the downlink control information (DCI)) carried on the PDCCH. For example, a 1-bit "CRISubRestrictionFlag2" variable may be set in the DCI to indicate whether the space beam forbidden is to be performed, when "CRISubRestrictionFlag2=1", it indicates that the space beam forbidden is to be performed, and when "CRISubRestrictionFlag2=0", it indicates not to perform space beam forbidden.

As one example of the improved dynamic configuration manner described above, the second control device transmits RRC signaling including information indicating space beams to be forbidden at time T1. The RRC signaling is rich in resources and can be used to carry the information indicating space beams to be forbidden. Subsequently, the DCI including "CRISubRestrictionFlag2=1" is transmitted at time T2, and the DCI including "CRISubRestrictionFlag2=0" is transmitted at time T3. When receiving the DCI including "CRISubRestrictionFlag2=1", the second terminal device does not feed back to the second control device the information indicating the space beams to be forbidden according to the previously received RRC signaling including the information indicating the space beams to be forbidden, so as to realize the forbidden of the space beams; upon receiving the DCI including "CRISubRestrictionFlag2=0", the normal measurement and feedback of reference signals is restored without forbidden processing. The time interval between T2 and T3 can be very short, thus achieving configuration flexibility.

In the improved dynamic configuration manner, using the rich resources on the PDSCH to carry the information occupying a relatively large amount of resources, indicating space beams to be forbidden, and using short configuration periods of the control information on the PDCCH to carry the information occupying a relatively small amount of resources, indicating whether to perform the space beams forbidden, the configuration flexibility can guaranteed while the requirements of the configuration resources are met.

In one embodiment, the space beams can be forbidden and unforbidden by MAC layer signaling (MAC Control Element) in conjunction with a forbidden timer.

In one embodiment, the forbidden and unforbidden of each space beam may be controlled with a third bit string with the number of bits consistent with the number of space beams of the second cell and a forbidden timer corresponding to each space beam.

For example, assuming that the number of space beams of the second cell is N=8, a third bit string of 8 bits is set in the MAC control element, wherein each bit indicates whether to forbid a corresponding one space beam of the eight space beams. For example, the 3rd, 6th, and 7th bits in the third bit string "01001100" being "1" means that the 3rd, 6th, and 7th space beams are forbidden, while the remaining bits being "0" mean that the remaining space beams are not forbidden.

In addition, the second control device configures, for the second terminal device, a forbidden timer corresponding to each of the 8 space beams of the second cell by, for example, RRC signaling. For example, while the 3rd, 6th, and 7th space beams are forbidden such that the second terminal device does not feed back information indicating the three space beams, the forbidden timers corresponding to the 3rd, 6th, and 7th space beams in the second terminal device start timing, during the period when the timing of the forbidden timer is reached, the 3rd, 6th, and 7th space beams are unforbidden, at that time, the second terminal device resumes normal space beam feedback without performing forbidden processing.

By the way of combining the above MAC layer signaling with the forbidden timer, it is possible to forbid a specific space beam only during a specific timing period. Since the situation of strong inter-cell interference usually does not last for a long time, the forbidden timer started internally in the second control device can act on balancing inter-cell interference. In addition, it is automatically unforbidden when reaching the timing period of the forbidden timer, thereby no special signaling is required to inform the unforbidden.

According to one embodiment of the present disclosure, performing interference coordination between the first cell and the second cell may include the second control device performing coordinated scheduling with the first control device so that the first control device and the second control device do not transmit control signals and/or data to the first terminal device on the same time-frequency resources or the first control device and the second control device transmit control signals and/or data to the first terminal device on the same time-frequency resources and different space beams.

In one embodiment, the second control device acquires information indicating that coordinated scheduling is to be performed from the first device to initiate coordinated scheduling with the first control device. The information indicating that the coordinated scheduling is to be performed can be delivered, for example, via an X2 interface. In one embodiment, the information indicating that the coordinated scheduling is to be performed may also be implemented by the information indicating space beams of reference signals of the second cell interfering with the first terminal device. In one embodiment, techniques such as coordinated scheduling/coordinated beamforming in CoMP technology may be used to perform coordinated scheduling of the first control device and the second control device.

In one embodiment, interference coordination between the first cell and the second cell is performed in the case that the service priority of the first control device is higher than the service priority of the second control device. In addition, in a case where the service priority of the first control device is lower than the service priority of the second control device, interference coordination between the first cell and the second cell is not performed.

A specific example of determining whether to perform interference coordination by comparing the service priority of the first control device with the service priority of the second control device has been described above with reference to the communication method for the first control device side of the wireless communication system according to an embodiment of the present disclosure, the description thereof will not be repeated herein.

According to one embodiment of the present disclosure, in the case that the second control device acquires a plurality pieces of information over a predetermined number indicating the space beams interfering with the first terminal device from the first control device, the interference coordination between the first cell and the second cell is performed.

For example, if the second control device acquires K interfering CRIs from the first control device (where K is above a predetermined number M), it indicates that the space beams in the second cell causes relatively strong interferences to a plurality of first terminal devices in the first cell, at this time, interference coordination between the first cell and the second cell is performed to reduce or eliminate interferences of the space beams in the second cell to the plurality of first terminal devices. In one embodiment, the predetermined number M can be preset in the first control device. In another embodiment, the predetermined number M may vary depending on channel conditions.

Next, an electronic device used in a second terminal device side for a wireless communication system and a communication method thereof according to an embodiment of the present disclosure will be described with reference to FIGS. 10 and 11. The second terminal device may, for example, correspond to the UE of the aggressor cell shown in FIG. 2. In addition, the first cell, the second cell, the first control device, the second control device, and the first terminal device, which are described below, may correspond to the serving cell, the aggressor cell, the serving base station, the aggressor base station and the UE of the serving cell shown in FIG. 2, respectively.

Figure 10:
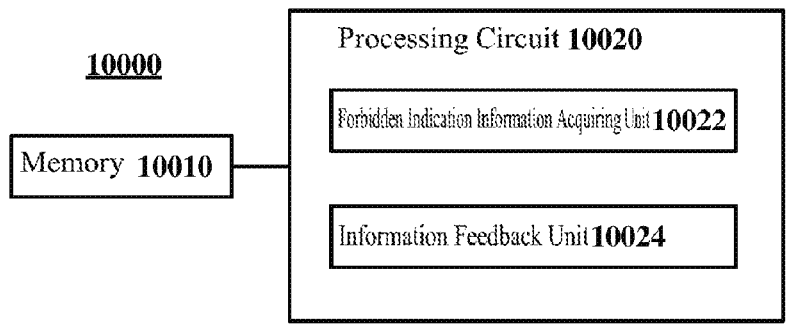
FIG. 10 is a configuration block diagram illustrating an electronic device for a second terminal device side of a wireless communication system according to an embodiment of the present disclosure.

FIG. 10 illustrates a configuration block diagram of an electronic device 10000 for a second terminal device side of a wireless communication system, according to an embodiment of the present disclosure. In one embodiment, the electronic device 10000 can include, for example, a memory 10010 and a processing circuit 10020.

The memory 10010 of the electronic device 10000 can store information generated by the processing circuit 10020 and programs and data operated by the electronic device 10000. The memory 10010 can be a volatile memory and/or a non-volatile memory. For example, the memory 10010 can include, but is not limited to, random access memory (RAM), dynamic random access memory (DRAM), static random access memory (SRAM), read only memory (ROM), and flash memory.

The processing circuit 10020 of the electronic device 10000 provides various functions of the electronic device 10000. In an embodiment of the present disclosure, the processing circuit 10020 of the electronic device 10000 may include a forbidden indication information acquiring unit 10022 and an information feedback unit 10024, configured to perform, respectively, steps S11000 and S11002 in the communication method of the electronic device for the second terminal device side of the wireless communication system illustrated in FIG. 11 described later.

The processing circuit 10020 may refer to various implementations of digital circuitry, analog circuitry, or mixed signal (combination of analog and digital) circuitry that perform functions in a computing system. The processing circuit may include, for example, circuit such as an integrated circuit (IC) and an application specific integrated circuit (ASIC), a portion or circuit of a separate processor core, an entire processor core, a separate processor, a programmable hardware device such as a field programmable gate array (FPGA), and/or a system including multiple processors.

Additionally, the electronic device 10000 can be implemented at the chip level, or can be implemented at the device level by including other external components. For example, the electronic device 10000 can be implemented as a second terminal device as a whole, and can also include one or more antennas.

It should be understood that the various elements described above are only logical blocks that are divided according to the specific functions that they implement, and are not intended to limit the specific implementation. In actual implementation, each of the above units may be implemented as a separate physical entity, or may be implemented by a single entity (e.g., a processor (CPU or DSP, etc.), an integrated circuit, etc.).

Figure 11:
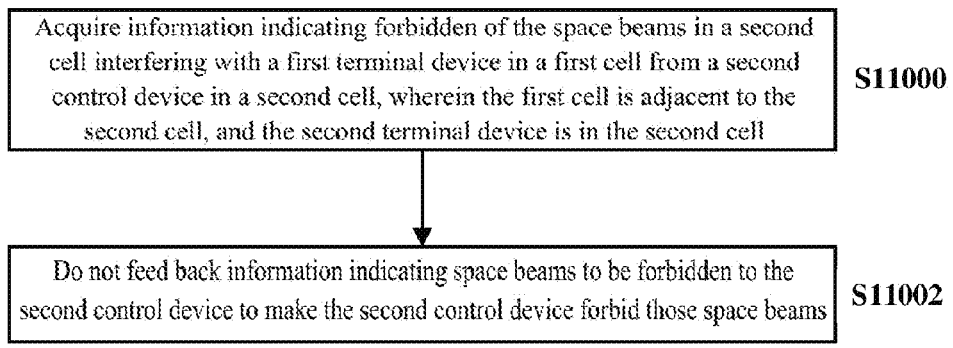
FIG. 11 is a flowchart illustrating a communication method for a second terminal device side of a wireless communication system according to an embodiment of the present disclosure.

FIG. 11 illustrates a flowchart of a communication method for a second terminal device side of a wireless communication system, according to an embodiment of the present disclosure. This communication method can be used, for example, for the electronic device 10000 as illustrated in FIG. 10.

As illustrated in FIG. 11, in step S11000, the second terminal device acquires information indicating forbidden of the space beams in a second cell interfering with a first terminal device in a first cell from a second control device in the second cell, wherein the first cell is adjacent to the second cell, and the second terminal device is in the second cell.

According to one embodiment of the present disclosure, the information indicating forbidden of the space beams in the second cell interfering with a first terminal device in a first cell may be implemented, for example, by using the first bit string or the second bit string shown in Table 2 or Table 3.

In step S11002, the second terminal device does not feed back information indicating space beams to be forbidden to the second control device to make the second control device forbid those space beams. Step S11002 may correspond, for example, to step S2012 in FIG. 2.

In one embodiment, the second terminal device measures the reference signals corresponding to the space beams other than the space beams to be forbidden, and feeds back the measurement result to the second control device, so that the information indicating the space beams to be forbidden is not fed back to the second control device.

In one embodiment, the second terminal device measures the reference signals corresponding to all the space beams, and when the strength of the space beam to be forbidden is measured to be the strongest, reports the information indicating the space beam with the second strongest strength, without reporting the information indicating the space beam to be forbidden with the strongest strength, such that the information indicating the space beam to be forbidden is not fed back to the second control device.

According to one embodiment of the present disclosure, in the case that the priority of the second terminal device is lower than a predetermined threshold, the information indicating space beams to be forbidden is not fed back to the second control device. In addition, in a case that the priority of the second terminal device is higher than a predetermined threshold, the second terminal device may ignore the acquired information indicating forbidden of space beams, and perform normal measurement and feedback of the reference signals, thereby not performing the forbidden processing. In one embodiment, in a case that the priority of the second terminal device is higher than a predetermined threshold, the second terminal device may also reject the signaling configuration (for example, the semi-static configuration, dynamic configuration, and improved dynamic configuration described above) performed by the second control device thereto for forbidding the space beam, thereby not performing the forbidden processing. Through the above processing, in a case that the priority of the second terminal device is higher, it is possible to preferentially ensure that the second terminal device obtains better power coverage.

In one embodiment, the predetermined threshold may be configured in advance by the second terminal device for the second terminal device.

The above embodiment mainly performs spatial precoding of a baseband for a CSI reference signal based on the architecture of the current LTE-A communication system and is described with multiple antenna transmissions. With the application of millimeter wave communication system and the development of device technology, the beamforming method of radio frequency can be used in place of the above-mentioned baseband spatial precoding, so that the emission energy of reference signals used for measuring space beam interferences in the present disclosure is focused on one or more directions. The measurement and reporting are performed by the receiving end device based on the above embodiment, while sharing and coordination are performed between the control devices. In a communication system that supports beamforming of radio frequency, the signaling between base stations used in the foregoing embodiments is implemented as Xn signaling, and the base station is implemented as a next-generation communication node B such as gNodeB deployed with a large scale antenna, and reference signals for measuring space beam interferences are still implemented as a CSI-RS or other specially designed reference signals. In a more specific example, the gNodeB transmits a radio frequency beamformed reference signals in different directions by adjusting the phase and amplitude of phase shifters of the multiple antennas connected to at least one radio frequency link (RF Chain) for measurement by the receiving end device.

Application examples according to the present disclosure will be described below.

The technology of the present disclosure can be applied to various products.

For example, the base station may be realized as any type of evolved Node B (eNB), such as a macro eNB and a small eNB, or a next generation communication node B such as a gNodeB. The small eNB may be an eNB covering a cell smaller than the macro cell, such as a pico eNB, a micro eNB, and a home (femto) eNB. Alternatively, the base station can be realized as any other types of base stations, such as a NodeB and a base transceiver station (BTS). The base station may include: a main body (that is also referred to as a base station device) configured to control wireless communication; and one or more remote radio heads (RRHs) disposed in a different place from the main body. Additionally, various types of terminals to be discussed later may also operate as a base station by temporarily or semi-persistently executing a base station function.

For example, the terminal device may be realized as a mobile terminal (such as a smart phone, a tablet personal computer (PC), a notebook PC, a portable game terminal, a portable/encrypted dongle type mobile router, and a digital camera apparatus) or an in-vehicle terminal (such as a car navigation device). The terminal device can also be realized as a terminal (that is also referred to as a machine type communication (MTC) terminal) that performs machine-to-machine (M2M) communication. Furthermore, the terminal device may be a wireless communication module (such as an integrated circuit module including a single die) mounted on each of the above terminals.

Application Examples of Base Station

First Application Example

Figure 12:
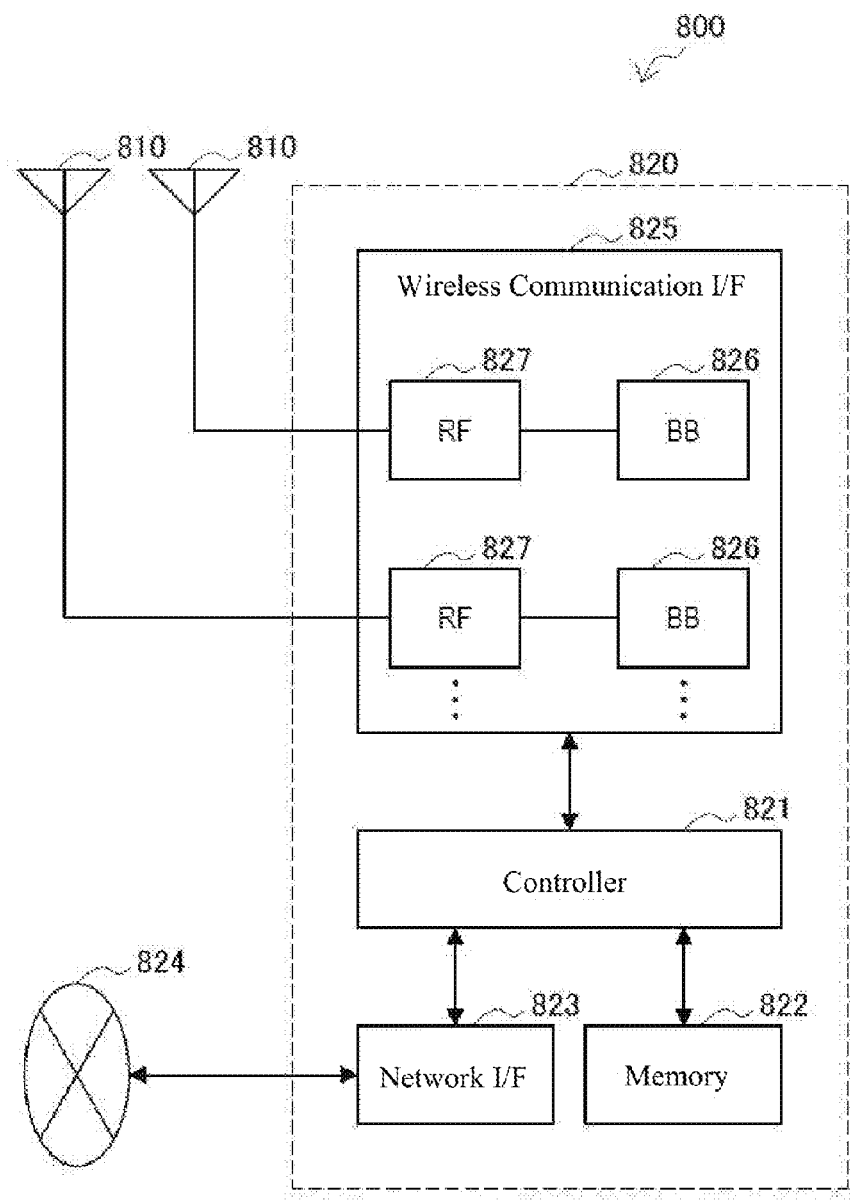
FIG. 12 is a block diagram illustrating a first example of a schematic configuration of an eNB according to an embodiment of the present disclosure.

FIG. 12 is a block diagram illustrating a first example of a schematic configuration of an eNB to which the technology of the present disclosure may be applied. The eNB 800 includes one or more antennas 810 and a base station device 820. The base station device 820 and each antenna 810 may be connected to each other via an RF cable.

Each of the antennas 810 includes a single or multiple antenna elements (such as multiple antenna elements included in a multiple input multiple output (MIMO) antenna), and is used for the base station device 820 to transmit and receive radio signals. The eNB 800 may include the multiple antennas 810, as illustrated in FIG. 12. For example, the multiple antennas 810 may be compatible with multiple frequency bands used by the eNB 800. Although FIG. 12 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of higher layers of the base station device 820. For example, the controller 821 generates data packets from data in signals processed by the wireless communication interface 825, and transfers the generated packets via the network interface 823. The controller 821 may bundle data from multiple base band processors to generate bundled packet(s) and transfer the generated bundled packet(s). The controller 821 may have logic functions of performing control such as radio resource control, radio bearer control, mobility management, admission control, and scheduling. This control may be performed in conjunction with an eNB or a core network node in the vicinity. The memory 822 includes RAM and ROM, and stores program that is executed by the controller 821, and various types of control data (such as a terminal list, transmission power data, and scheduling data).

The network interface 823 is a communication interface for connecting the base station device 820 to the core network 824. The controller 821 can communicate with a core network node or another eNB via the network interface 823. In this case, the eNB 800, and the core network node or other eNBs may be connected to each other through a logical interface (such as S1 interface and X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme (such as LTE and LTE-Advanced), and provides radio connection to terminal(s) positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). The BB processor 826 may have a part or all of the above-described logic functions instead of the controller 821. The BB processor 826 may be a memory that stores a communication control program, or a module that includes a processor and related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 12. For example, the multiple BB processors 826 may be compatible with multiple frequency bands used by the eNB 800. The wireless communication interface 825 may include the multiple RF circuits 827, as illustrated in FIG. 12. For example, the multiple RF circuits 827 may be compatible with multiple antenna elements. Although FIG. 12 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 13:
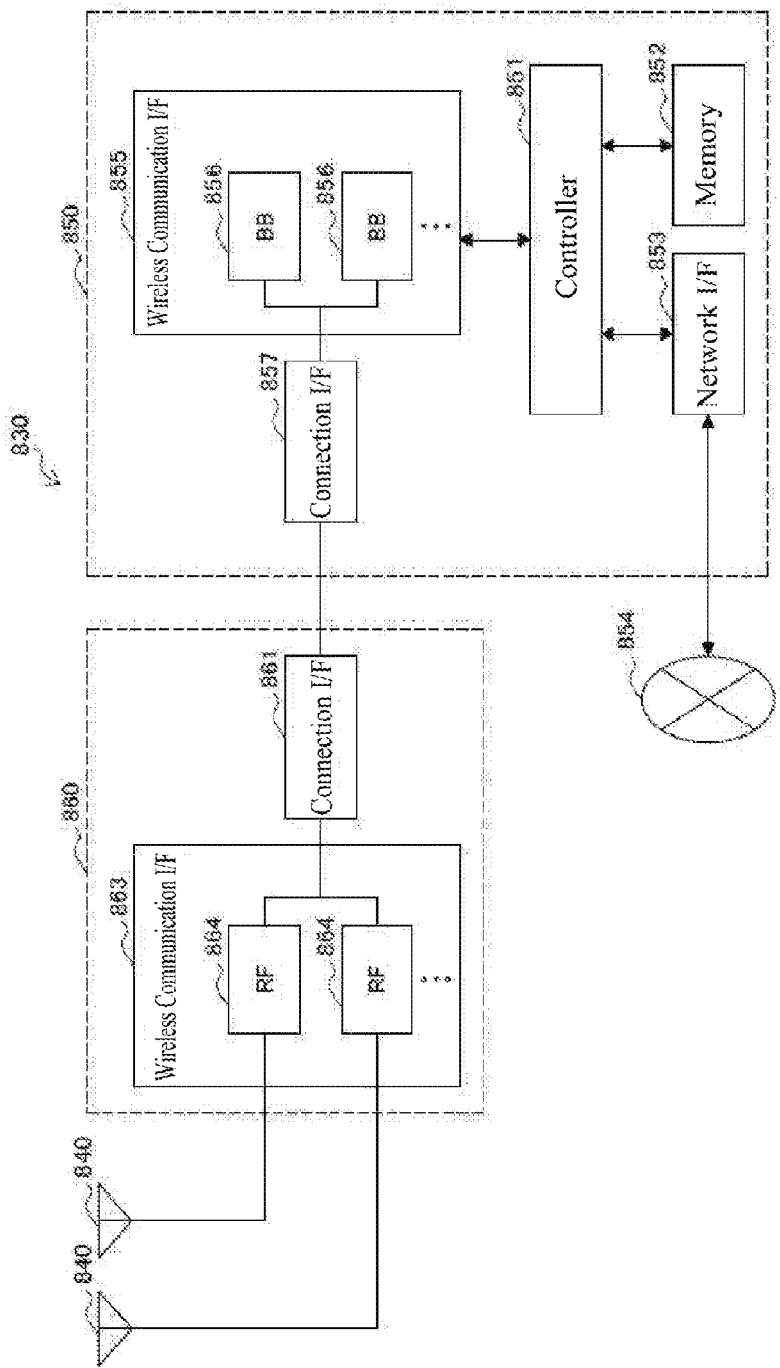
FIG. 13 is a block diagram illustrating a second example of a schematic configuration of an eNB according to an embodiment of the present disclosure.

FIG. 13 is a block diagram illustrating a second example of a schematic configuration of an eNB to which the technology of the present disclosure may be applied. The eNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or multiple antenna elements (such as multiple antenna elements included in a MIMO antenna) and is used for the RRH 860 to transmit and receive radio signals. The eNB 830 may include the multiple antennas 840, as illustrated in FIG. 13. For example, the multiple antennas 840 may be compatible with multiple frequency bands used by the eNB 830. Although FIG. 13 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 12.

The wireless communication interface 855 supports any cellular communication scheme (such as LTE and LTE-Advanced) and provides wireless communication to terminal(s) positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 12, except that the BB processor 856 is connected to the RF circuit 864 of the RRH 860 via the connection interface 857. The wireless communication interface 855 may include the multiple BB processors 856, as illustrated in FIG. 13. For example, the multiple BB processors 856 may be compatible with multiple frequency bands used by the eNB 830. Although FIG. 13 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communicating in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 13. For example, the multiple RF circuits 864 may support multiple antenna elements. Although FIG. 13 illustrates the example in which the wireless communication interface 863 includes the multiple RF circuits 864, the wireless communication interface 863 may also include a single RF circuit 864.

In the eNB 800 and the eNB 830 illustrated in FIGS. 12 and 13, the one or more components included in the processing circuit 6020 described with reference to FIG. 6 and the processing circuit 8020 described with reference to FIG. 8 may be realized in the wireless communication interface 912. Alternatively, at least a portion of these components may also be realized by the controller 821 and the controller 851.

Application Examples Regarding Terminal Device

First Application Example

Figure 14:
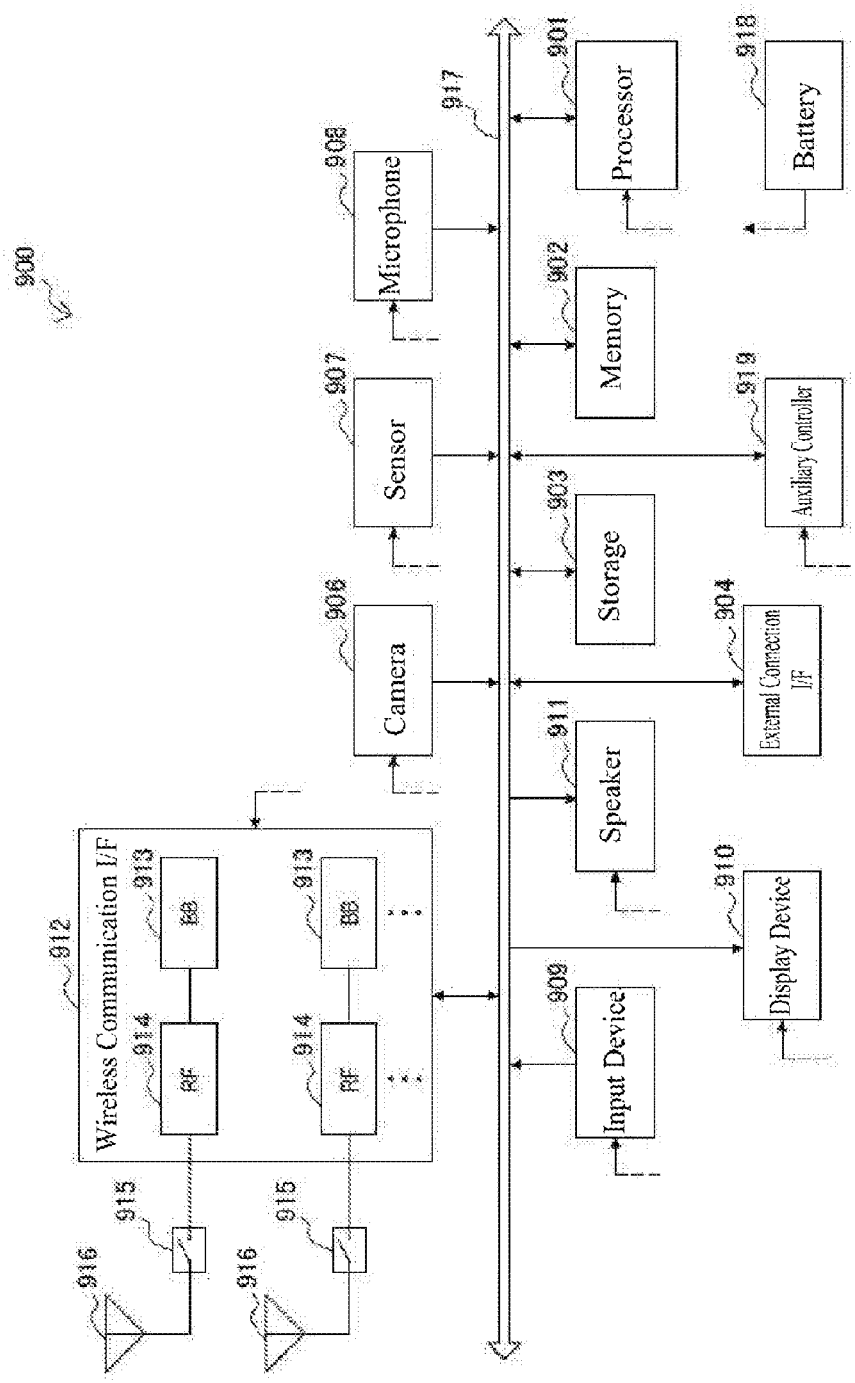
FIG. 14 is a block diagram illustrating an example of a schematic configuration of a smartphone according to an embodiment of the present disclosure.

FIG. 14 is a block diagram illustrating an example of a schematic configuration of a smartphone 900 to which the technology of the present disclosure may be applied. The smart phone 900 includes a processor 901, a memory 902, a storage 903, an external connection interface 904, an camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates captured image(s). The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives operation(s) or information input from a user. The display device 910 includes a screen such as a liquid crystal display (LCD) and an organic light emitting diode (OLED) display, and displays an output image of the smartphone 900. The speaker 911 converts audio signals that are output from the smartphone 900 to sounds.

The wireless communication interface 912 supports any cellular communication scheme (such as LTE and LTE-Advanced) and performs wireless communication. The wireless communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may be one chip module that has the BB processor 913 and the RF circuit 914 integrated thereon. The wireless communication interface 912 may include the multiple BB processors 913 and the multiple RF circuits 914, as illustrated in FIG. 14. Although FIG. 14 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme, such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna) and is used for the wireless communication interface 912 to transmit and receive wireless signals. Smart phone 900 may include multiple antennas 916, as illustrated in FIG. 14. Although FIG. 14 illustrates the example in which the smartphone 900 includes the multiple antennas 916, the smartphone 900 may also include a single antenna 916.

Furthermore, the smart phone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smart phone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 illustrated in FIG. 14, the one or more components included in the processing circuit 4020 described with reference to FIG. 4 and the processing circuit 10020 described with reference to FIG. 10 may be realized in the wireless communication interface 912. Alternatively, at least some of these components may also be realized by the processor 901 or the auxiliary controller 919.

Second Application Example

Figure 15:
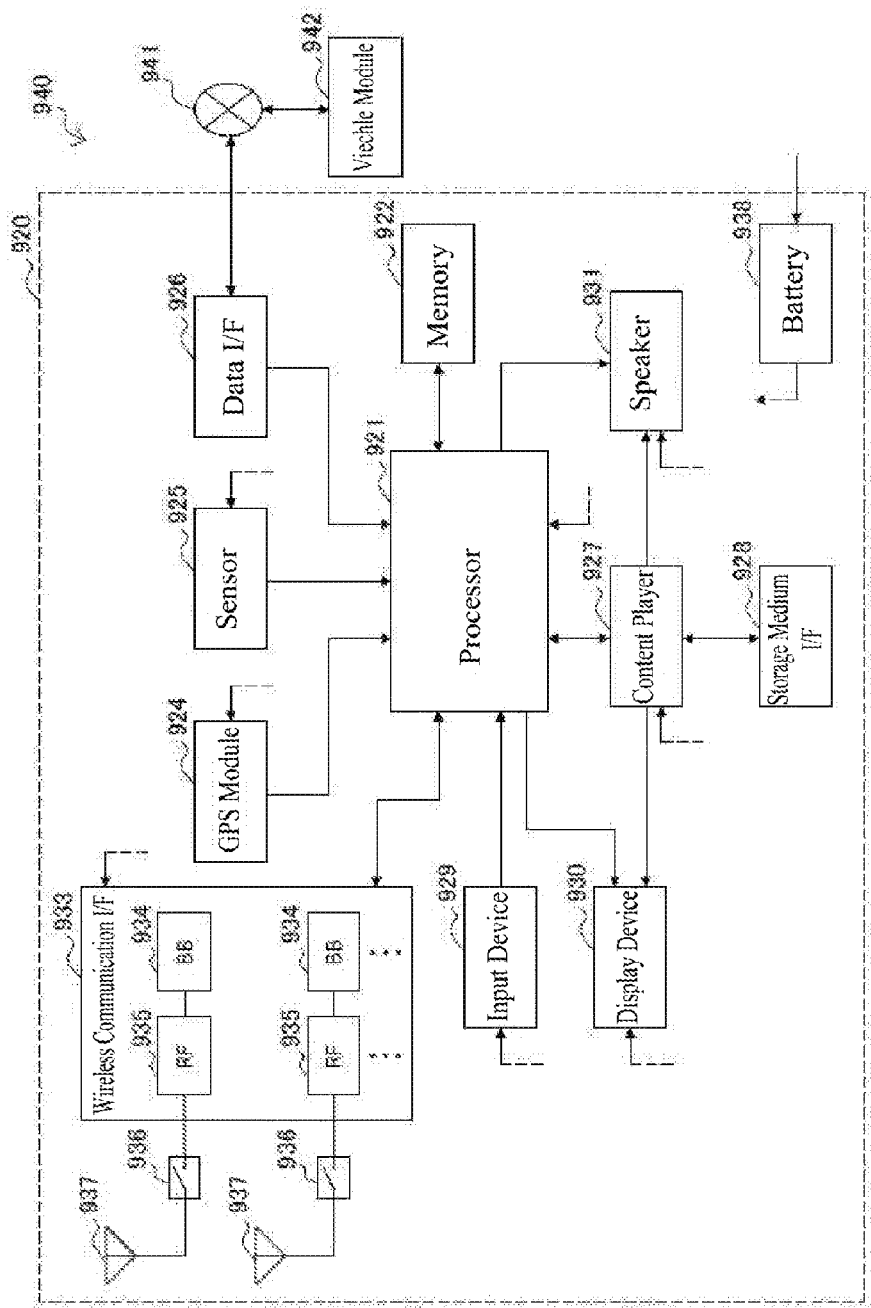
FIG. 15 is a block diagram illustrating an example of a schematic configuration of a car navigation device according to an embodiment of the present disclosure.

FIG. 15 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a wireless communication interface 933, one or more antenna switches 936, one or more antennas 937, and a battery 938.

The processor 921 may be, for example, a CPU or a SoC and controls a navigation function and another function of the car navigation device 920. The memory 922 includes RAM and ROM, and stores data and program that is executed by the processor 921.

The GPS module 924 uses GPS signals received from a GPS satellite to measure a position (such as latitude, longitude, and altitude) of the car navigation device 920. The sensor 925 may include a group of sensor, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives operation(s) or information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme (such as LTE and LTE-Advanced) and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may also be one chip module having the BB processor 934 and the RF circuit 935 integrated thereon. The wireless communication interface 933 may include the multiple BB processors 934 and the multiple RF circuits 935, as illustrated in FIG. 15. Although FIG. 15 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near-field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna) and is used for the wireless communication interface 933 to transmit and receive wireless signals. The car navigation device 920 may include the multiple antennas 937, as illustrated in FIG. 15. Although FIG. 15 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 15 via feeders lines that are partially shown as dashed lines in the figure. The battery 938 accumulates power supplied from the vehicle.

In the car navigation device 920 illustrated in FIG. 15, the one or more components included in the processing circuit 4020 described with reference to FIG. 4 and the processing circuit 10020 described with reference to FIG. 10 may be realized in the wireless communication interface 912. Alternatively, at least some of these components may also be realized by processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and failure information, and outputs the generated data to the in-vehicle network 941.

It is to be understood that the phrase "embodiment" or a similar expression in this specification means that a particular feature, structure, or characteristic described in connection with the embodiment is included in at least one specific embodiment of the present disclosure. Therefore, in the specification, the appearance of the terms "in an embodiment of the present disclosure" and the like is not necessarily referring to the same embodiment.

Those skilled in the art will appreciate that the present disclosure is embodied as a system, an apparatus, a method, or a computer readable medium as a computer program product. Accordingly, the present disclosure may be embodied in various forms, such as a complete hardware embodiment, a complete software embodiment (including firmware, resident software, microcode, etc.), or as an implementation of software and hardware, which will be referred to as "circuit", "module" or "system" below. Furthermore, the present disclosure may also be embodied in any tangible media form as a computer program product having computer usable program code stored thereon.

The related description of the present disclosure is described with reference to flowchart illustrations and/or block diagrams of systems, apparatuses, methods, and computer program products according to specific embodiments of the present disclosure. It will be understood that each block of each flowchart and/or block diagram, and any combination of blocks in the flowcharts and/or block diagrams may be embodied using computer program instructions. These computer program instructions may be executed by a machine composed of a general purpose computer or a processor of a special computer or other programmable data processing apparatus, and the instructions are processed by a computer or other programmable data processing apparatus for implementation of the functions or operations described in the flowchart(s) and/or block diagram(s).

The flowcharts and block diagrams of the architecture, functions, and operations that may be embodied by the systems, apparatus, methods, and computer program products according to various embodiments of the present disclosure are shown in the drawings. Thus, each block in the flowcharts or block diagrams may represent a module, a segment, or a portion of program code that comprises one or more executable instructions to implement the specified logical function. Additionally, it should be noted that in some other embodiments, the functions described in the blocks may not be performed in the order as illustrated. By way of example, two blocks illustrated as connected may in fact be executed simultaneously, or in some cases, may also be executed in the reverse order as illustrated, depending on the function involved. In addition, it should be noted that blocks of each block diagram and/or flowchart, and combinations of blocks in the block diagrams and/or flowcharts may be embodied by means of a system based on dedicated hardware(s), or specific functions or operations may be performed by means of a combination of dedicated hardware (s) and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An electronic device used in a second control device side of a wireless communication system including:
   a memory for storing computer instructions; and
   a processing circuit configured to perform the computer instructions stored thereon for:
   notifying a first control device in the first cell adjacent to a second cell controlled by the second control device of configuration information of reference signals of the second cell, for a first terminal device in the first cell to determine interferences of space beams corresponded to the reference signals of the second cell to the first terminal device based on the configuration information;
   acquiring information indicating the space beams interfering with the first terminal device in the second cell from the first control device; and
   performing interference coordination between the first cell and the second cell based on the acquired information indicating the space beams interfering with the first terminal device,
   wherein, performing interference coordination between the first cell and the second cell includes forbidding at least one of the space beams interfering with the first terminal device, and notifying one or more second terminal devices in the second cell of information indicating space beams to be forbidden, so that the one or more second terminal devices do not feedback information indicating those space beams to the second control device,
   wherein, the second control device notifies the second terminal device in the second cell with a priority lower than a predetermined threshold of the information indicating space beams to be forbidden.

2. The electronic device according to claim 1, wherein the reference signals are beamformed channel state information reference signals CSI-RS, the information indicating the space beams interfering with the first terminal device includes CSI-RS resource indicator and the number of the second cell.

3. The electronic device according to claim 1, wherein performing interference coordination between the first cell and the second cell includes:
   the second control device performs coordination scheduling with the first control device so that the first control device and the second control device do not transmit control signals and/or data to the first terminal device on the same time-frequency resources or the first control device and the second control device transmit control signals and/or data to the first terminal device on the same time-frequency resources and different space beams.

4. The electronic device according to claim 1, wherein performing interference coordination between the first cell and the second cell in the case that the service priority of the first control device is higher than the service priority of the second control device, or
   in the case that the second control device acquires a plurality pieces of information over a predetermined number indicating the space beams interfering with the first terminal device interfering reference signals from the first control device.

5. An electronic device used in a second terminal device side of a wireless communication system including:
   a memory for storing computer instructions; and
   a processing circuit configured to perform the computer instructions stored thereon for:
   acquiring information indicating forbidden of the space beams in a second cell interfering with a first terminal device in a first cell from a second control device in the second cell, wherein the first cell is adjacent to the second cell, and the second terminal device is in the second cell; and
   not feeding back information indicating space beams to be forbidden to the second control device to make the second control device forbid those space beams.

6. The electronic device according to claim 5, wherein not feeding back the information indicating space beams to be forbidden to the second control device in the case that the priority of the second terminal device is lower than a predetermined threshold.

7. An electronic device used in a first control device side of a wireless communication system including:
- a memory for storing computer instructions; and
- a processing circuit configured to perform the computer instructions stored thereon for:
- acquiring configuration information of reference signals of a second cell from a second control device in the second cell adjacent to a first cell controlled by the first control device, for a first terminal device in the first cell to determine interferences of space beams corresponded to the reference signals of the second cell to the first terminal device based on the configuration information;
- acquiring information indicating the space beams interfering with the first terminal device in the second cell from the first terminal device; and
- performing interference coordination between the first cell and the second cell based on the acquired information indicating the space beams interfering with the first terminal device,
- wherein performing interference coordination between the first cell and the second cell includes that the first control device notifies the second control device of the information indicating the space beams interfering with the first terminal device, for the second control device to forbid those space beams.

8. The electronic device according to claim 7, wherein the reference signals are beamformed channel state information reference signals CSI-RS, the information indicating the space beams interfering with the first terminal device includes CSI-RS resource indicator and the number of the second cell.

9. The electronic device according to claim 7, wherein performing interference coordination between the first cell and the second cell in the case that the service priority of the first control device is higher than the service priority of the second control device, or
in the case that the first control device acquires a plurality pieces of information over a predetermined number indicating the space beams interfering with the first terminal device from a plurality of the first terminal devices over the predetermined number.

10. The electronic device according to claim 7, wherein performing interference coordination between the first cell and the second cell includes:
- the first control device performs coordination scheduling with the second control device so that the first control device and the second control device do not transmit control signals and/or data to the first terminal device on the same time-frequency resources or the first control device and the second control device transmit control signals and/or data to the first terminal device on the same time-frequency resources and different space beams.

11. A communication method for a wireless communication system including:
- a second terminal device acquires information indicating forbidden of the space beams in a second cell interfering with a first terminal device in a first cell from a second control device in the second cell, wherein the first cell is adjacent to the second cell, and the second terminal device is in the second cell; and
- the second terminal device does not feedback information indicating space beams to be forbidden to the second control device to make the second control device forbid those space beams.

12. A non-transitory computer readable storage medium comprising executable instructions which, when executed by an information processing apparatus, cause the information processing apparatus to perform a communication method, the communication method comprising:
- acquiring information indicating forbidden of the space beams in a second cell interfering with a first terminal device in a first cell from a second control device in the second cell, wherein the first cell is adjacent to the second cell, and the second terminal device is in the second cell; and
- not feeding back information indicating space beams to be forbidden to the second control device to make the second control device forbid those space beams.

* * * * *